United States Patent
Nishiwaki et al.

(10) Patent No.: US 8,243,032 B2
(45) Date of Patent: Aug. 14, 2012

(54) TOUCH PANEL, DISPLAY DEVICE AND TOUCH PANEL MANUFACTURING METHOD

(75) Inventors: Shogo Nishiwaki, Mie (JP); Yoshiharu Kataoka, Mie (JP); Toru Daito, Mie (JP); Shinya Tanaka, Mie (JP); Yukihiko Nishiyama, Mie (JP); Shingo Kawashima, Mie (JP); Hiroyuki Kaigawa, Mie (JP); Takayuki Urabe, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 972 days.

(21) Appl. No.: 12/297,405

(22) PCT Filed: Jan. 31, 2007

(86) PCT No.: PCT/JP2007/051586
§ 371 (c)(1),
(2), (4) Date: Oct. 16, 2008

(87) PCT Pub. No.: WO2007/144993
PCT Pub. Date: Dec. 21, 2007

(65) Prior Publication Data
US 2009/0096759 A1    Apr. 16, 2009

(30) Foreign Application Priority Data

Jun. 12, 2006 (JP) .................. 2006-162585
Aug. 31, 2006 (JP) .................. 2006-235051

(51) Int. Cl.
*G06F 3/041* (2006.01)
(52) U.S. Cl. ........................................ 345/173
(58) Field of Classification Search .................. None
See application file for complete search history.

(56) References Cited

U.S. PATENT DOCUMENTS

RE40,770 E * 6/2009 Maeda ........................ 345/90

FOREIGN PATENT DOCUMENTS

| JP | 63-205724 | 8/1988 |
| JP | 2006-11522 | 1/2006 |
| JP | 2008-32756 | 2/2008 |
| WO | 03/001443 | 1/2003 |
| WO | 2006/054585 | 5/2006 |

OTHER PUBLICATIONS

Machine translation of JP,2006-011522,A (published Jan. 12, 2006); on May 31, 2012.*
International Search Report for PCT/JP2007/051586, mailed Apr. 17, 2007.

* cited by examiner

Primary Examiner — Paul Huber
(74) Attorney, Agent, or Firm — Nixon & Vanderhye, P.C.

(57) ABSTRACT

A touch panel includes an insulating substrate, a transparent touch electrode provided on the insulating substrate, and a frame portion connected to a periphery of the touch electrode. The touch panel detects a touched position on the touch electrode based on an electric signal through the frame portion. The frame portion is provided between the insulating substrate and the touch electrode.

11 Claims, 23 Drawing Sheets

FIG. 20

| | S1 | | | | | | |
|---|---|---|---|---|---|---|---|
| 0 | 45 | 115 | 185 | 215 | 285 | 355 | [mm] |

| | | | | | | |
|---|---|---|---|---|---|---|
| 60 | $1.0\times10^3$ | $1.0\times10^3$ | $1.1\times10^3$ | $1.1\times10^3$ | $1.1\times10^3$ | $1.1\times10^3$ |
| 95 | $1.0\times10^3$ | $1.1\times10^3$ | $1.1\times10^3$ | $1.1\times10^3$ | $1.1\times10^3$ | $1.1\times10^3$ |
| 130 | $1.0\times10^3$ | $1.1\times10^3$ | $1.1\times10^3$ | $1.1\times10^3$ | $1.1\times10^3$ | $1.1\times10^3$ |
| | | C1 | | | C2 | |
| 165 | $9.8\times10^2$ | $1.1\times10^3$ | $1.1\times10^3$ | $1.1\times10^3$ | $1.0\times10^3$ | $1.0\times10^3$ |
| 200 | $9.5\times10^2$ | $1.0\times10^3$ | $1.1\times10^3$ | $1.1\times10^3$ | $1.0\times10^3$ | $9.6\times10^2$ |
| 235 | $9.2\times10^2$ | $1.0\times10^3$ | $1.1\times10^3$ | $1.1\times10^3$ | $1.0\times10^3$ | $9.4\times10^2$ |
| | | C3 | | | C4 | |
| 270 | $9.1\times10^2$ | $9.9\times10^2$ | $1.1\times10^3$ | $1.1\times10^3$ | $1.0\times10^3$ | $9.2\times10^2$ |
| 305 | $9.1\times10^2$ | $9.8\times10^2$ | $1.1\times10^3$ | $1.1\times10^3$ | $1.0\times10^3$ | $9.1\times10^2$ |
| 340 | $9.1\times10^2$ | $9.7\times10^2$ | $1.0\times10^3$ | $1.0\times10^3$ | $9.9\times10^2$ | $9.2\times10^2$ |
| | | C5 C7 | | | C6 C8 | |
| 375 | $9.4\times10^2$ | $9.8\times10^2$ | $1.0\times10^3$ | $1.0\times10^3$ | $9.8\times10^2$ | $9.2\times10^2$ |
| 410 | $9.5\times10^2$ | $9.6\times10^2$ | $9.8\times10^2$ | $9.7\times10^2$ | $9.4\times10^2$ | $9.0\times10^2$ |
| 445 | $9.2\times10^2$ | $9.1\times10^2$ | $9.1\times10^2$ | $9.0\times10^2$ | $8.7\times10^2$ | $8.3\times10^2$ |

| S2 | 0 | 45 | 115 | 185 | 215 | 285 | 355 [mm] |
|---|---|---|---|---|---|---|---|
| 60 | | — | — | — | — | — | — |
| 95 | | — | $5.3 \times 10^3$ | — | — | $2.0 \times 10^7$ | — |
| 130 | | — | $1.1 \times 10^4$ | — | — | — | — |
| | | | C1 | | | C2 | |
| 165 | | $6.0 \times 10^7$ | $8.1 \times 10^3$ | — | — | $1.2 \times 10^8$ | — |
| 200 | | — | $3.3 \times 10^3$ | — | — | $2.0 \times 10^4$ | — |
| 235 | | $1.3 \times 10^5$ | — | — | — | — | — |
| | | | C3 | | | C4 | |
| 270 | | $1.4 \times 10^4$ | $9.7 \times 10^3$ | — | — | — | — |
| 305 | | — | $3.6 \times 10^3$ | — | — | $2.5 \times 10^4$ | — |
| 340 | | $1.6 \times 10^6$ | $4.2 \times 10^3$ | $1.7 \times 10^6$ | — | — | — |
| | | | C5 | C7 | | C6 | C8 |
| 375 | | $3.6 \times 10^7$ | $2.8 \times 10^3$ | $1.8 \times 10^4$ | $2.6 \times 10^4$ | $1.2 \times 10^4$ | — |
| 410 | | — | $4.2 \times 10^3$ | — | — | $2.4 \times 10^4$ | — |
| 445 | | — | — | — | — | — | — |

[mm]

TOUCH PANEL, DISPLAY DEVICE AND TOUCH PANEL MANUFACTURING METHOD

This application is the U.S. national phase of International Application No. PCT/JP2007/051586, filed 31 Jan. 2007, which designated the U.S. and claims priority to Japan Application Nos. 2006-162585, filed 12 Jun. 2006, and 2006-235051, filed 31 Aug. 2006, the entire contents of each of which are hereby incorporated by reference.

TECHNICAL FIELD

The invention relates to a touch panel, display device, and touch panel manufacturing method. More particularly, the invention relates to a touch panel that is manufactured by photolithography.

BACKGROUND ART

A touch panel is a device for interactively inputting information to an information processing device such as a computer by touching (pressing) with a finger, pen, or the like.

Touch panels are divided into various types according to the operation principles, such as a resistive type, capacitive type, infrared type, ultrasonic type, and electromagnetic induction type. The resistive type and capacitive type touch panels can be mounted on display devices and the like at low cost. These types of touch panels have therefore been widely used in recent years.

The capacitive type touch panel includes a transparent touch electrode provided on the whole substrate surface, a conductive frame portion provided in the periphery of the touch electrode, a plurality of position detection electrodes connected to the frame portion, and wiring portions connecting each position detection electrode and a position detection circuit for detecting a touched position. The capacitive type touch panel is mounted on, for example, the front surface of a display screen of a liquid crystal display panel.

In the capacitive type touch panel, when the front surface of the display screen, that is, the surface of a substrate that forms the touch panel, is touched, the touch electrode is grounded at the touched point through capacitance of a human body. This causes change in resistance value between each position detection electrode and the grounded point. The position detection circuit detects the touched position based on the change in resistance value between each position detection electrode and the grounded point.

For example, Patent document 1 describes a manufacturing method of a capacitive type touch screen panel (touch panel) that eliminates non-uniform color display in a panel end portion.

Patent document 1: Japanese PCT National Phase Laid-Open Patent Publication No. 2004-537107

DISCLOSURE OF THE INVENTION

Problems to be Solved by the Invention

In the capacitive type touch panel, it is preferable for higher position recognition accuracy that the touch electrode has a high resistance and the frame portion, each position detection electrode, and each wiring portion have a low resistance. In many cases, therefore, the touch electrode is formed by a transparent conductive film such as an IZO (Indium Zinc Oxide) film and the frame portion, each position detection electrode, and each wiring portion are formed by a low-resistance metal conductive film such as aluminum in separate steps.

As a touch panel manufacturing method using photolithography, therefore, the frame portion, each position detection electrode, and each wiring portion can be formed after the touch electrode is formed on an insulating substrate such as a glass substrate, as in the touch panel structure disclosed in Patent document 1. However, since a conductive film that forms the frame portion, each position detection electrode, and each wiring portion is formed and patterned by dry etching, the touch electrode that has already been formed may be partially etched at its surface by the dry etching process. Such partial etching of the touch electrode surface may cause variation in film thickness of the touch electrode in the substrate plane, causing variation in resistance value of the touch electrode in the substrate plane. As a result, position recognition accuracy of the touch panel is reduced.

Moreover, with recent increase in size of a liquid crystal display panel, the size of a glass substrate that forms the liquid crystal display panel has been increasing more and more, and the film thickness of the touch electrode tends to vary in the substrate plane. Reduction in position recognition accuracy of the touch panel is therefore a concern in this regard as well.

The invention is made in view of the above problems and it is an object of the invention to provide a touch panel having high position recognition accuracy.

Means for Solving the Problems

In order to achieve the above object, a conductive portion is provided between an insulating substrate and a transparent electrode according to the invention.

More specifically, a touch panel according to the invention includes: an insulating substrate; a transparent touch electrode provided on the insulating substrate; and a conductive portion connected to a periphery of the touch electrode. The touch panel detects a touched position on the touch electrode based on an electric signal through the conductive portion. The conductive portion is provided between the insulating substrate and the touch electrode.

In the above structure, since the conductive portion is provided between the insulating substrate and the touch electrode, the touch electrode is formed after the conductive portion is formed on the insulating substrate. Since the touch electrode has not been formed yet when the conductive portion is formed, the touch electrode is not etched during formation of the conductive portion. This reduces variation in film thickness of the touch electrode in the substrate plane and thus reduces variation in resistance value of the touch electrode in the substrate plane. Reduction in position recognition accuracy of the touch panel can therefore be suppressed. A touch panel having high position recognition accuracy can thus be provided.

The conductive portion may be a frame portion provided along the periphery of the touch electrode, and a wiring portion connected to the touch electrode through the frame portion may be connected to the frame portion.

In the above structure, an electric signal based on the touched position on the touched electrode is applied to the frame portion connected to the periphery of the touch electrode and the wiring portion connected to the frame portion, whereby the touched position on the touch electrode is detected.

The frame portion and the wiring portion may be formed by a same material.

In the above structure, since the frame portion and the wiring portion are formed by the same material, the frame portion and the wiring portion can be formed without increasing the manufacturing process.

The frame portion may have a rectangular frame shape, and four wiring portions may be provided so as to be respectively connected to four corners of the frame portion.

In the above structure, a capacitive type touch panel is structured specifically.

The frame portion and the wiring portion may be formed by an alloy film containing silver and palladium or an alloy film containing silver, palladium, and copper.

In the above structure, when the frame portion and the wiring portion are formed by an alloy film containing silver and palladium, the alloy film is a highly conductive material and therefore the frame portion and the wiring portion can be formed with a small thickness and the touch electrode can easily cover the frame portion. When the frame portion and the wiring portion are formed by an alloy film containing silver, palladium, and copper, reliability of migration resistance, corrosion resistance, and the like can be improved by this alloy film.

The insulating substrate may be a glass substrate, and an interlayer film for improving an adhesion property between the insulating substrate and the frame portion and wiring portion may be provided between the insulating substrate and the frame portion and wiring portion.

An adhesion property is generally poor between a glass substrate and an alloy film containing silver and palladium. In the above structure, by inserting the interlayer film between the glass substrate and the alloy film containing silver and palladium, an adhesion property between the insulating substrate and the frame portion and wiring portion is improved.

The interlayer film may be provided only in a region overlapping the frame portion and the wiring portion.

In the above structure, the interlayer film is not provided in a region other than the region overlapping the frame portion and the wiring portion. In other words, the interlayer film is not provided in the panel plane (a display region in a display device). The transmittance of the touch panel is therefore improved.

The touch electrode may be extended so as to cover the frame portion and the wiring portion.

An alloy film containing silver and palladium is a material whose electric resistance is likely to change with time. In the above structure, by covering the frame portion and the wiring portion with the touch electrode, change in electric resistance with time can be suppressed in the frame portion and the wiring portion. Moreover, by covering the frame portion and the wiring portion with the touch electrode, the frame portion and the wiring portion can be protected from, for example, hydrochloric acid contained in an etchant for patterning a transparent conductive film to form the touch electrode.

The touch electrode may be extended at an end of the wiring portion, and a terminal portion of the wiring portion may be formed by the extended portion of the touch electrode at the end of the wiring portion.

In the above structure, an alloy film containing silver and palladium which forms the wiring portion is not formed in the terminal portion. Change in electric resistance with time can therefore be suppressed in the wiring portion.

The touch electrode may be formed by a compound of indium oxide and tin oxide.

In the above structure, the frame portion and the wiring portion are formed by an alloy film containing silver and palladium. This suppresses a galvanic corrosion reaction between a compound of indium oxide and tin oxide, that is, an ITO (Indium Tin Oxide) film, and an aluminum film, which occurs when the frame portion and the wiring portion are formed by an aluminum film.

The touch panel of the invention is effective especially in a display device in which a display panel is provided so as to face the touch panel.

A touch panel manufacturing method according to the invention is a method for manufacturing a touch panel including an insulating substrate, a transparent touch electrode provided on the insulating substrate, and a conductive portion connected to a periphery of the touch electrode, for detecting a touched position on the touch electrode based on an electric signal through the conductive portion. The method includes: a conductive portion formation step of forming the conductive portion by forming a metal conductive film on the insulating substrate and patterning the metal conductive film; and a touch electrode formation step of forming the touch electrode by forming a transparent conductive film so as to cover the formed conductive portion and patterning the transparent conductive film.

In the above method, the touch electrode is formed in the touch electrode formation step after the conductive portion is formed on the insulating substrate in the conductive potion formation step. Since the touch electrode has not been formed yet in the conductive portion formation step, the touch electrode is not etched in the conductive portion formation step. This reduces variation in film thickness of the touch electrode in the substrate plane and thus reduces variation in resistance value of the touch electrode in the substrate plane. Reduction in position recognition accuracy of the touch panel is therefore suppressed. A touch panel having high position recognition accuracy can thus be provided.

The conductive portion may be a frame portion provided along the periphery of the touch electrode, a wiring portion connected to the touch electrode through the frame portion may be connected to the frame portion, and the frame portion and the wiring portion may be formed in the conductive portion formation step.

In the above method, the frame portion and the wiring portion are simultaneously formed in the conductive portion formation step. The frame portion and the wiring portion can thus be formed without increasing the manufacturing process.

The metal conductive film may be patterned by dry etching in the conductive portion formation step.

In the above method, there is no possibility that the surface of the touch electrode is partially etched by dry etching. The function and effect of the invention can therefore be effectively obtained.

The insulating substrate may be a glass substrate, and the conductive portion may be formed by an alloy film containing silver and palladium or an alloy film containing silver, palladium, and copper, and the method may further include, before the conductive portion formation step, an interlayer film formation step of forming on the insulating substrate an interlayer film for improving an adhesion property to the conductive portion.

An adhesion property is generally poor between a glass substrate and an alloy film containing silver and palladium or an alloy film containing silver, palladium, and copper. In the above method, by forming the interlayer film between the glass substrate and the alloy film containing silver and palladium or the alloy film containing silver, palladium, and copper in the interlayer film formation step, an adhesion property between the insulating substrate and the conductive portion is improved.

In the interlayer film formation step, the interlayer film may be formed in a region overlapping the conductive portion by using a metal mask.

In the above method, the interlayer film is not provided in a region other than the region overlapping the conductive portion (for example, the frame portion and the wiring portion). In other words, the interlayer film is not provided in the panel plane (a display region in a display device). The transmittance of the touch panel is therefore improved.

The conductive portion may be a frame portion provided along the periphery of the touch electrode, a wiring portion connected to the touch electrode through the frame portion may be connected to the frame portion, and in the touch electrode formation step, a terminal portion of the wiring portion may be formed by patterning the transparent conductive film so that the transparent conductive film extends to an end of the wiring portion.

In the above method, the alloy film containing silver and palladium which forms the wiring portion is not formed in the terminal portion. Change in electric resistance with time is therefore suppressed in the wiring portion.

Effects of the Invention

According to the invention, a conductive portion is provided between an insulating substrate and a transparent electrode. Therefore, a touch panel having high position recognition accuracy can be provided.

BRIEF DESCRIPTION OF THE DRAWINGS

FIG. 2 is a plan view of a touch panel 20a of the liquid crystal display device 50a;

FIG. 6 is a schematic diagram illustrating an operation principle of the touch panel 20a;

FIG. 7 is a flowchart illustrating a manufacturing process of the touch panel 20a;

FIG. 20 is a schematic plan view showing the surface resistance of an IZO layer in a substrate S1 in a practical example;

FIG. 44 is a flowchart illustrating a manufacturing process of the touch panel 120a; and FIG. 45 is a schematic plan view showing the surface resistance of an IZO layer in a substrate S2 of the comparative example.

DESCRIPTION OF THE REFERENCE NUMERALS

Figure 1:
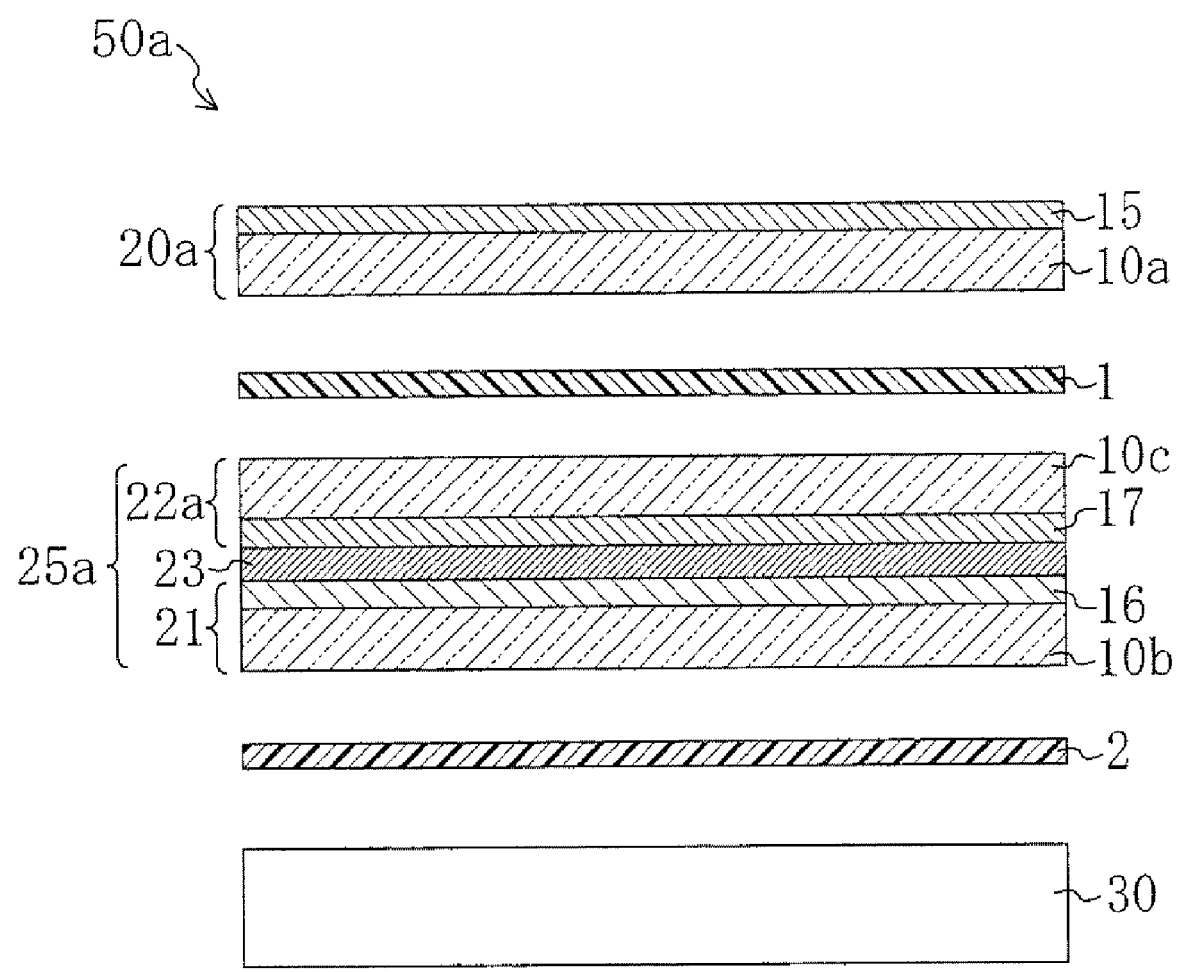
FIG. 1 is a structural diagram of a liquid crystal display device 50a according to a first embodiment.

F frame portion (conductive portion)
W wiring portion
10a insulating substrate 11 aluminum film (metal conductive film)
11aa, 11ab conductive portion
12 titanium nitride film (metal conductive film)
13 IZO film, ITO film (transparent conductive film)
13a touch electrode
18 titanium oxide film (interlayer film)
19 AP film (alloy film)
20a, 20b touch panel
25a, 25b, 25c liquid crystal display panel
50a, 50b, 50c liquid crystal display device

BEST MODE FOR CARRYING OUT THE
INVENTION

Hereinafter, embodiments of the invention will be described in detail with reference to the accompanying drawings. Note that, although a liquid crystal display device is described as an example of a display device in the following embodiments, the invention is not limited to the following embodiments.

(First Embodiment)

FIGS. 1 through 20 show a first embodiment of a touch panel, liquid crystal display device, and touch panel manufacturing method according to the invention.

FIG. 1 is a schematic structural diagram of a liquid crystal display device 50a.

As shown in FIG. 1, the liquid crystal display device 50a includes a liquid crystal display panel 25a having polarizing plates 1 and 2 attached to its top and bottom surfaces, respectively, a touch panel 20a provided above the liquid crystal display panel 25a, and a backlight 30 provided below the liquid crystal display panel 25a for supplying light to a display region of the liquid crystal display panel 25a.

As shown in FIG. 1, the liquid crystal display panel 25a includes an active matrix substrate 21 and a color filter substrate 22a that are provided so as to face each other, and a liquid crystal layer 23 interposed between the substrates 21 and 22a.

The active matrix substrate 21 includes an insulating substrate 10b such as a glass substrate, a thin film transistor (TFT) array layer 16 provided on the insulating substrate 10b, and an alignment film (not shown) provided on the TFT array layer 16. The TFT array layer 16 includes, on the insulating substrate 10b, a plurality of gate lines (not shown) provided so as to extend in parallel with each other, a plurality of source lines (not shown) provided so as to extend in parallel with each other in a direction perpendicular to the gate lines, TFTs (not shown) respectively provided at intersection of the gate lines and source lines, and pixel electrodes (not shown) respectively connected to the TFTs.

The color filter substrate 22a includes an insulating substrate 10c such as a glass substrate, a color filter layer 17 provided on the insulating substrate 10c, an overcoat layer (not shown) provided on the color filter layer 17, a common electrode (not shown) provided on the overcoat layer, and an alignment film (not shown) provided on the common electrode. The color filter layer 17 includes a plurality of colored layers (not shown) colored with red, green, or blue and provided respectively corresponding to the pixel electrodes on the active matrix substrate 21, and a black matrix (not shown) provided between the colored layers.

The liquid crystal layer 23 includes a nematic liquid crystal material having an electro-optic property.

The polarizing plates 1 and 2 have a function to allow only a polarized component of a specific direction in incident light to transmit therethrough.

Figure 2:
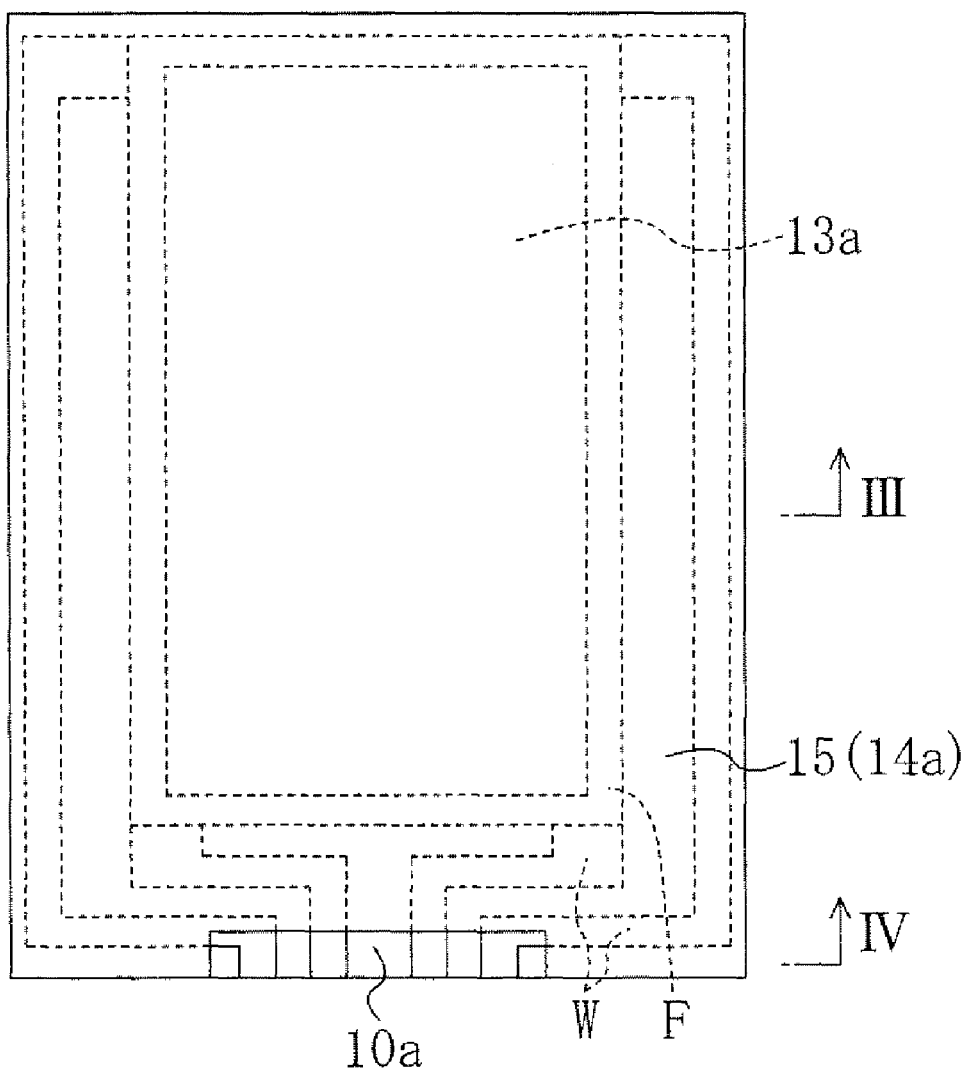
Figure 3:
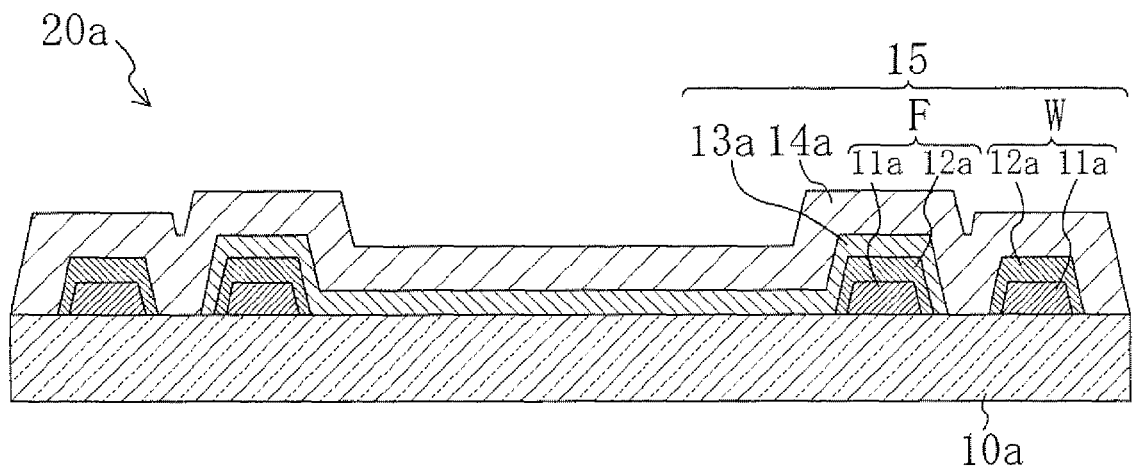
FIG. 3 is a cross-sectional view in the panel plane of the touch panel 20a taken along line III-III in FIG. 2.

As shown in FIGS. 1 and 2, the touch panel 20a includes an insulating substrate 10a and a touch panel layer 15 provided on the insulating substrate 10a. FIG. 2 is a plan view of the touch panel 20a. FIG. 3 is a cross-sectional view in the panel plane of the touch panel 20a taken along line III-III in FIG. 2, and FIG. 4 is a cross-sectional view of a terminal portion of the touch panel 20a taken along line IV-IV in FIG. 2.

As shown in FIGS. 2 and 3, the touch panel layer 15 includes a rectangular touch electrode 13a, a frame portion F provided along the periphery of the touch electrode 13a as a rectangular frame-shaped conductive portion, four wiring portions W respectively connected to the four corners of the frame portion F, and a protective layer 14a provided so as to cover the touch electrode 13a, the frame portion F and each wiring portion W. The frame portion F is provided between the insulating substrate 10a and the peripheral portion of the touch electrode 13a. The frame portion F is thus connected to the periphery of the touch electrode 13a.

Figure 4:
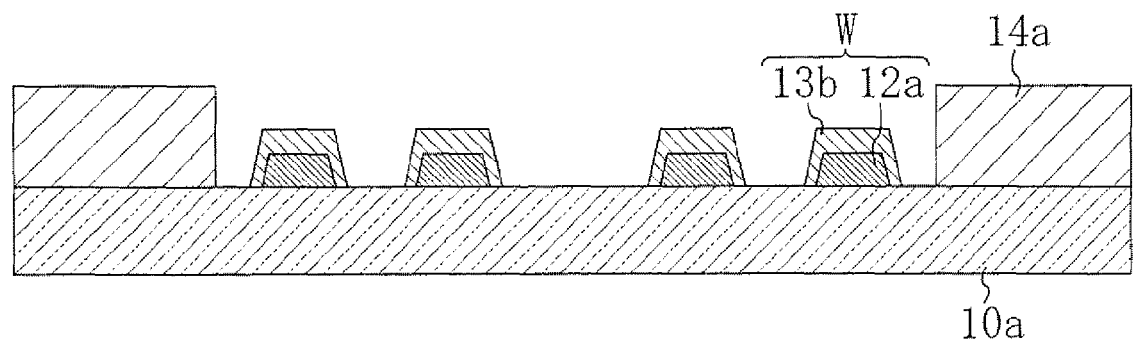
FIG. 4 is a cross-sectional view of a terminal portion of the touch panel 20a taken along line IV-IV in FIG. 2.

In the touch panel 20a, as shown in FIGS. 2 and 4, each wiring portion W is exposed from the protective layer 14a in the terminal portion. A position detection circuit (not shown) for receiving and outputting a position detection electric signal from and to the touch electrode 13a is connected to each wiring portion W in the terminal portion. When the surface of the touch electrode 13a of the touch panel 20a is touched through the protective layer 14a, the touch electrode 13a is grounded at the touched point through the capacitance of a human body, which changes a resistance value between the four corners of the frame portion F and the grounded point. The position detection circuit then detects the touched position based on the change in resistance value between the four corners of the frame portion F and the grounded point.

Hereinafter, a basic principle of a capacitive type position detection method used in this embodiment will be described with reference to FIG. 5.

Figure 5:
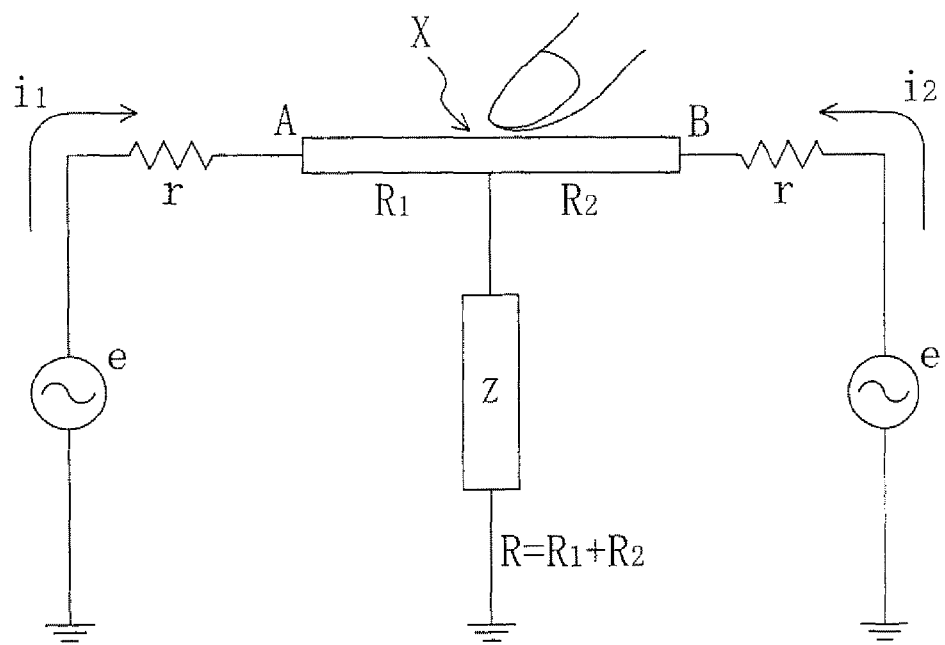
FIG. 5 is a schematic diagram illustrating an operation principle of a capacitive type touch sensor using a one-dimensional resistor.

In FIG. 5, for simplification of explanation, a one-dimensional resistor interposed between electrodes A and B is shown as a touch electrode. In an actual display device, the touch electrode 13a spreading two-dimensionally provides the same function as that of the one-dimensional resistor.

A current-voltage conversion resistor r is connected to each electrode A, B. The electrodes A and B are connected to the position detection circuit.

A voltage of the same phase and same potential (alternating current e) is applied between the electrode A and the ground and between the electrode B and the ground. In this case, since the electrodes A and B are always at the same potential, no current flows between the electrodes A and B.

It is now assumed that a position X is touched by a finger, $R_1$ is a resistance from the position X touched by a finger to the electrode A, $R_2$ is a resistance from the position X to the electrode B, and $R=R_1+R_2$. Provided that Z is a human impedance, $i_1$ is a current flowing through the electrode A, and $i_2$ is a current flowing through the electrode B, the following formulae are obtained:

$$e = ri_1 + R_1 i_1 + (i_1 + i_2)Z \quad (1)$$

$$e = ri_2 + R_2 i_2 + (i_1 + i_2)Z \quad (2)$$

The following formulae (3) and (4) are obtained from the above formulae (1) and (2):

$$i_1(r+R_1) = i_2(r+R_2) \quad (3)$$

$$i_2 = i_1(r+R_1)/(r+R_2) \quad (4)$$

The following formula (5) is obtained by substituting the formula (4) for the formula (1):

$$e = ri_1 + R_1i_1 + (i_1 + i_1(r+R_1)/(r+R_2))Z \quad (5)$$
$$= i_1(R(Z+r) + R_1R_2 + 2Zr + r^2)/(r+R_2)$$

The following formula (6) is obtained from the above formula (5):

$$i_1 = e(r+R_2)/(R(Z+r) + R_1R_2 + 2Zr + r^2) \quad (6)$$

Similarly, the following formula (7) is obtained:

$$i_2 = e(r+R_1)/(R(Z+r) + R_1R_2 + 2Zr + r^2) \quad (7)$$

The following formula (8) is obtained when the ratio of $R_1$ to $R_2$ is represented by using the overall resistance R:

$$R_1/R = (2r/R+1)i_2/(i_1+i_2) - r/R \quad (8).$$

Since r and R are known, $R_1/R$ can be determined from the formula (8) by obtaining the current $i_1$ flowing through the electrode A and the current $i_2$ flowing through the electrode B by measurement. Note that $R_1/R$ is independent of the impedance Z including a person who touched with a finger. The formula (8) is therefore obtained unless the impedance Z is zero or infinite, and change and state caused by a person and material can be ignored.

Figure 6:
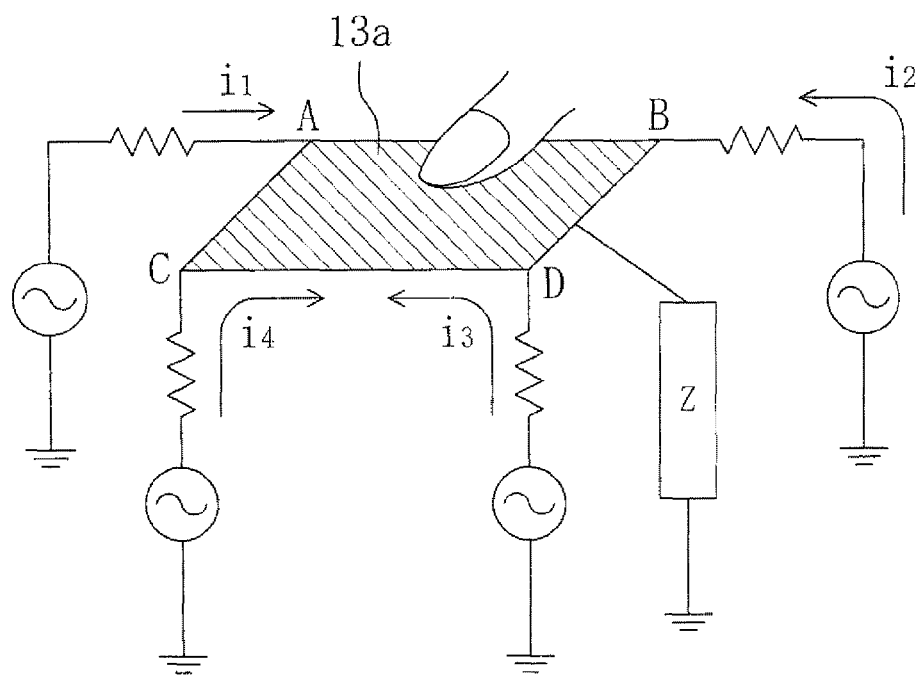

Hereinafter, an example in which the relational expressions in the one-dimensional case described above are applied to a two-dimensional case will be described with reference to FIG. 6. As shown in FIG. 6, position detection electrodes A, B, C, and D are respectively formed at the four corners of the frame portion F (not shown) of the touch electrode 13*a*. These position detection electrodes A, B, C, and D are connected to the position detection circuit through the respective wiring portions W.

It is herein assumed that an alternating current voltage of the same phase and same potential is applied to the position detection electrodes A, B, C, and D, and $i_1$, $i_2$, $i_3$, and $i_4$ are currents that flow through the respective wiring portions W (position detection electrodes A, B, C, and D) by contact with a finger or the like. In this case, the following formulae are obtained by the same calculation as that shown above:

$$X = k_1 + k_2 \cdot (i_2+i_3)/(i_1+i_2+i_3+i_4) \quad (9)$$

$$Y = k_1 + k_2 \cdot (i_2+i_3)/(i_1+i_2+i_3+i_4) \quad (10)$$

X is an X coordinate of a touched position on the touch electrode 13*a* and Y is a Y coordinate of the touched position on the touch electrode 13*a*. Moreover, $k_1$ is an offset, $k_2$ is a scale factor, and $k_1$ and $k_2$ are constants that are independent of a human impedance.

Based on the above formulae (9) and (10), the contact position can be determined from the measured current values $i_1$, $i_2$, $i_3$, and $i_4$ flowing through the respective position detection electrodes A, B, C, and D.

In the above example, an electrode is provided at each of the four corners of the touch electrode 13*a*, and the contact position on a two-dimensionally spreading plane is detected by measuring a current flowing through each electrode. However, the number of electrodes on the touch electrode 13*a* is not limited to four. Although the minimum number of electrodes required for two-dimensional position detection is three, position detection accuracy can be improved by increasing the number of electrodes to 5 or more.

Hereinafter, a manufacturing method of the touch panel 20*a* having the above structure will be described with reference to the flowchart of FIG. 7 and the cross-sectional views of FIGS. 8 through 19. FIGS. 8 through 14 are cross-sectional views of a substrate corresponding to FIG. 3 during the manufacturing process, and FIGS. 15 through 19 are cross-sectional views of the substrate corresponding to FIG. 4 during the manufacturing process. The manufacturing method of this embodiment includes a conductive portion formation step, a touch electrode formation step, and a protective layer formation step.

(Conductive Portion Formation Step)

Figure 7:
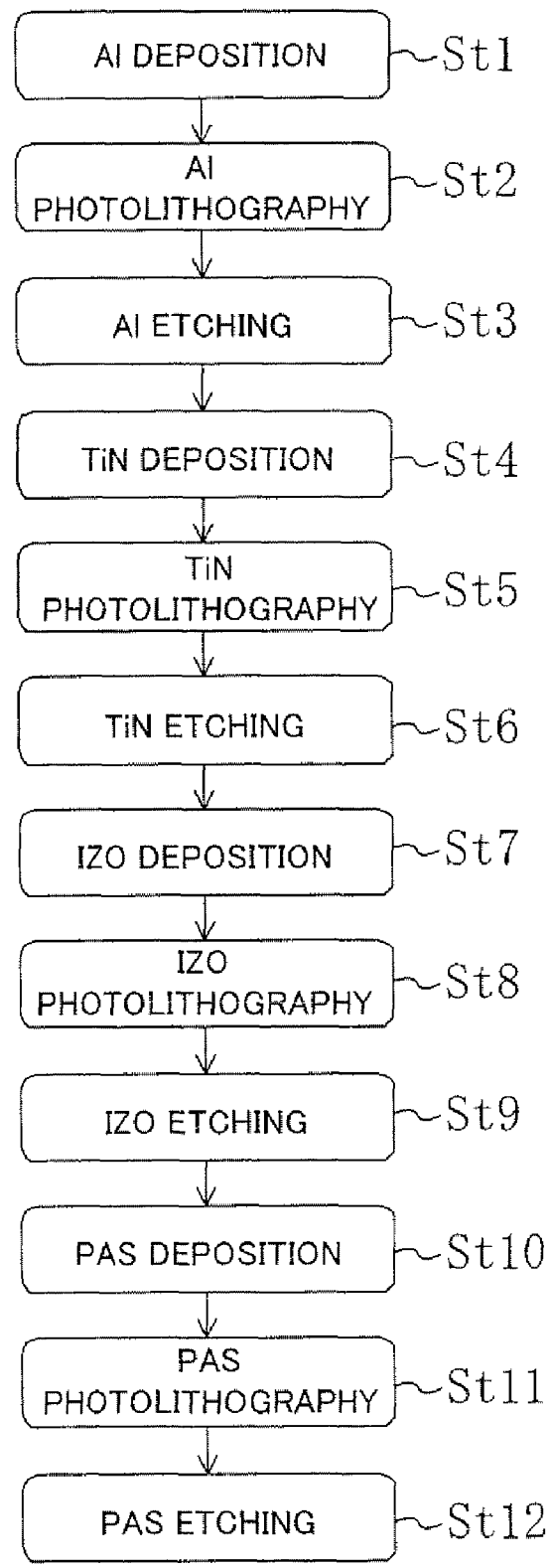
Figure 8:
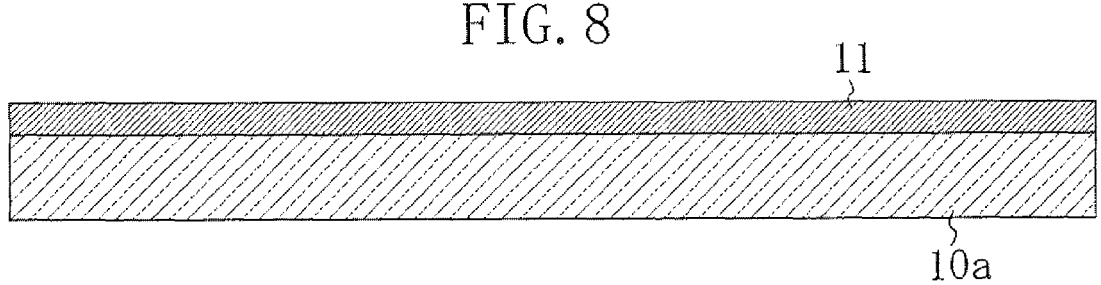
FIG. 8 is a cross-sectional view of a substrate corresponding to FIG. 3 after an aluminum film 11 is formed.

First, as Al deposition in St1 of FIG. 7, an aluminum film 11 (thickness: about 2,000 Å), for example, is formed by a sputtering method as a metal conductive film on an insulating substrate 10*a* such as a glass substrate, as shown in FIG. 8.

As Al photolithography in St2 of FIG. 7, a resist film is then formed by applying a resist made of a photosensitive resin onto the aluminum film 11, and a first resist pattern (not shown) is formed by exposing and developing the resist film.

Figure 9:
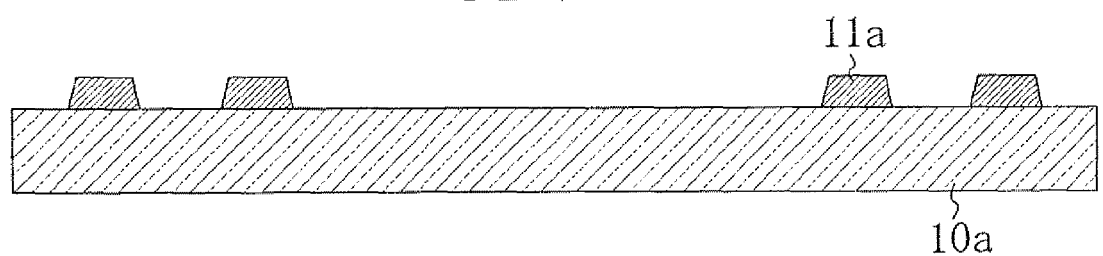
FIG. 9 is a cross-sectional view of a substrate corresponding to FIG. 3 after the aluminum film 11 is patterned.

As Al etching in St3 of FIG. 7, by wet etching the aluminum film by using the first resist pattern as a mask, an aluminum layer 11*a* is formed as shown in FIG. 9.

Figure 10:
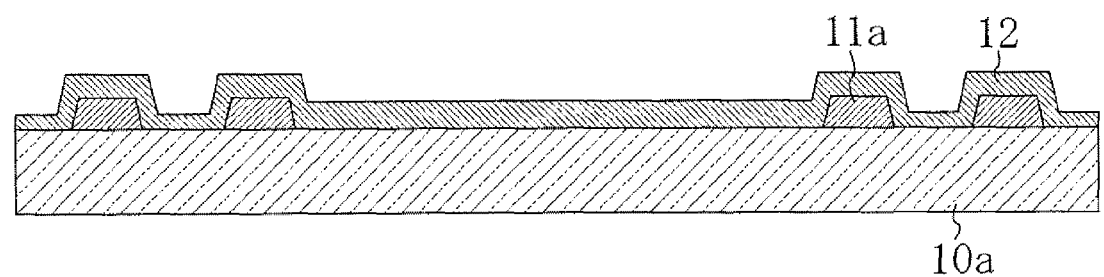
FIG. 10 is a cross-sectional view of a substrate corresponding to FIG. 3 after a titanium nitride film 12 is formed.
Figure 15:
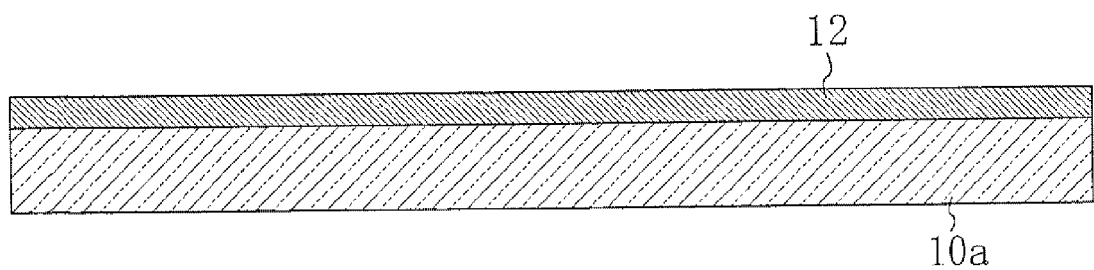
FIG. 15 is a cross-sectional view of a substrate corresponding to FIG. 4 after a titanium nitride film 12 is formed.

Thereafter, as TiN deposition in St4 of FIG. 7, a titanium nitride film 12 (thickness: about 2,000 Å) is formed by a sputtering method as a metal conductive film so as to cover the aluminum layer 11*a*, as shown in FIGS. 10 and 15.

As TiN photolithography in St5 of FIG. 7, a resist film is then formed by applying a resist made of a photosensitive resin onto the titanium nitride film 12, and a second resist pattern (not shown) is formed by exposing and developing the resist film.

Figure 11:
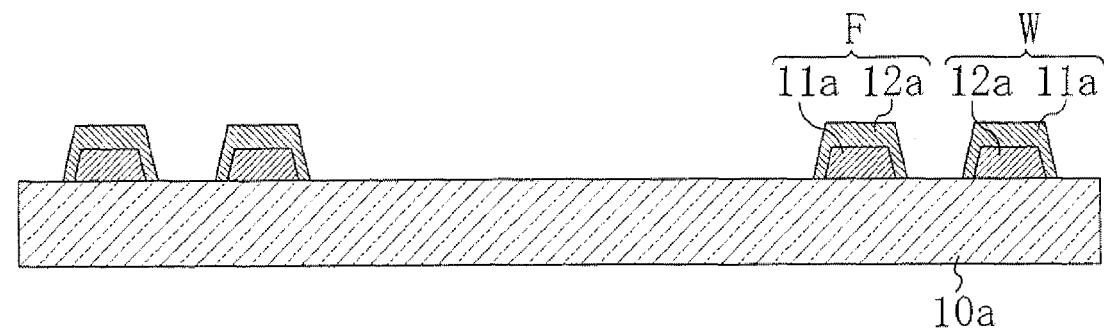
FIG. 11 is a cross-sectional view of a substrate corresponding to FIG. 3 after the titanium nitride film 12 is patterned.
Figure 16:
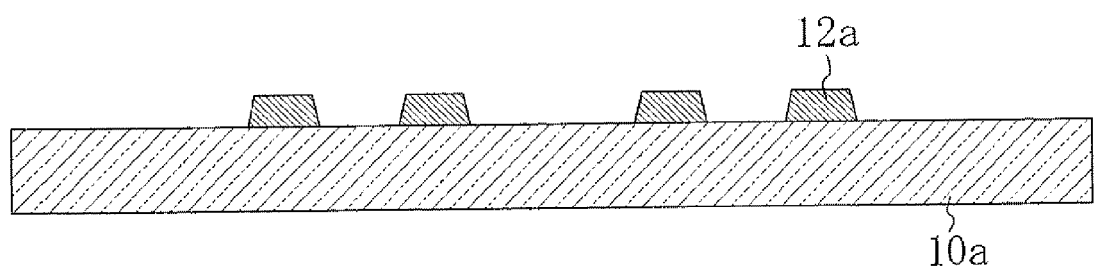
FIG. 16 is a cross-sectional view of a substrate corresponding to FIG. 4 after the titanium nitride film 12 is patterned.

As TiN etching in St6 of FIG. 7, by dry etching the titanium nitride film 12 by using the second resist pattern as a mask, a titanium nitride layer 12*a* is formed as shown in FIGS. 11 and 16. Wiring portions W and a frame portion F are thus formed. More desirably, a wet cleaning process may be performed in order to remove an etching residue of the titanium nitride film.

(Touch Electrode Formation Step)

Figure 12:
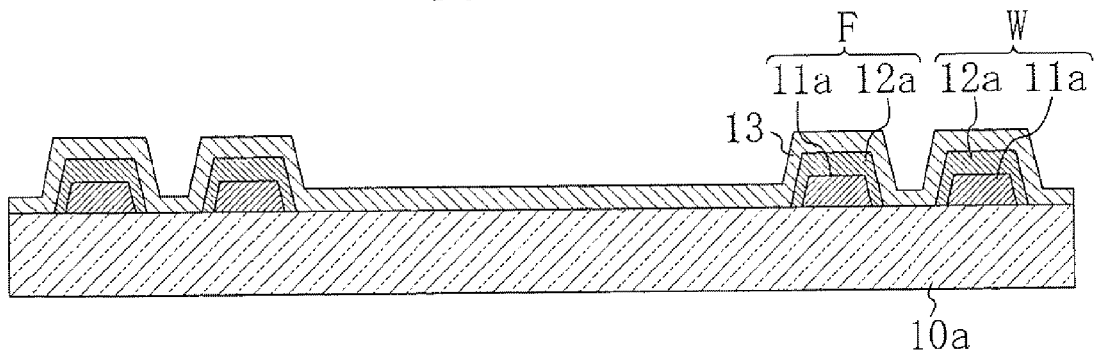
FIG. 12 is a cross-sectional view of a substrate corresponding to FIG. 3 after an IZO film 13 is formed.
Figure 17:
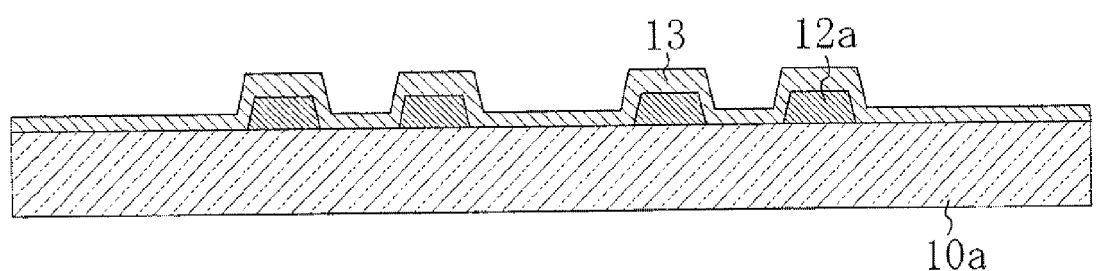
FIG. 17 is a cross-sectional view of a substrate corresponding to FIG. 4 after an IZO film 13 is formed.

First, as IZO deposition in St7 of FIG. 7, an IZO (Indium Zinc Oxide) film 13 (thickness: about 100 Å), for example, is formed by a sputtering method as a transparent conductive film so as to cover the wiring portions W and the frame portion F, as shown in FIGS. 12 and 17.

Thereafter, as IZO photolithography in St8 of FIG. 7, a resist film is formed by applying a resist made of a photosensitive resin onto the IZO film 13, and a third resist pattern (not shown) is formed by exposing and developing the resist film.

Figure 13:
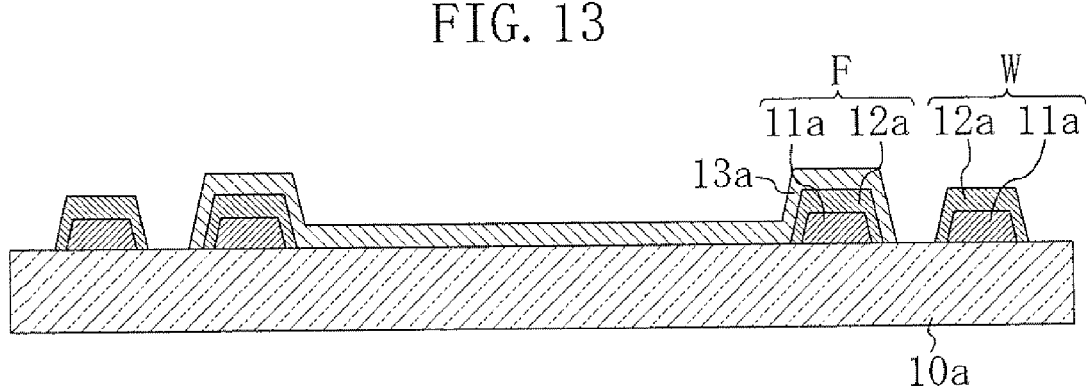
FIG. 13 is a cross-sectional view of a substrate corresponding to FIG. 3 after the IZO film 13 is patterned.
Figure 18:
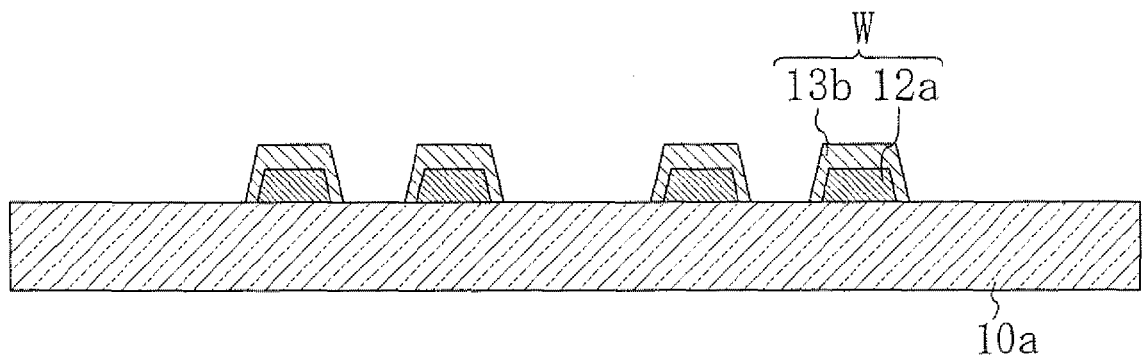
FIG. 18 is a cross-sectional view of a substrate corresponding to FIG. 4 after the IZO film 13 is patterned.

As IZO etching in St9 of FIG. 7, by wet etching the IZO film 13 by using the third resist pattern as a mask, a touch electrode 13*a* and an IZO layer 13*b* are formed as shown in FIGS. 13 and 18.

(Protective Layer Formation Step)

Figure 14:
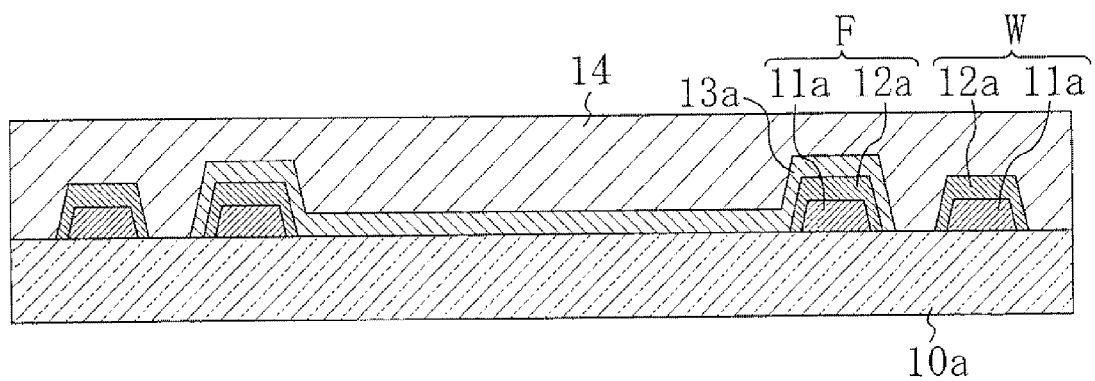
FIG. 14 is a cross-sectional view of a substrate corresponding to FIG. 3 after a silicon nitride film 14 is formed.
Figure 19:
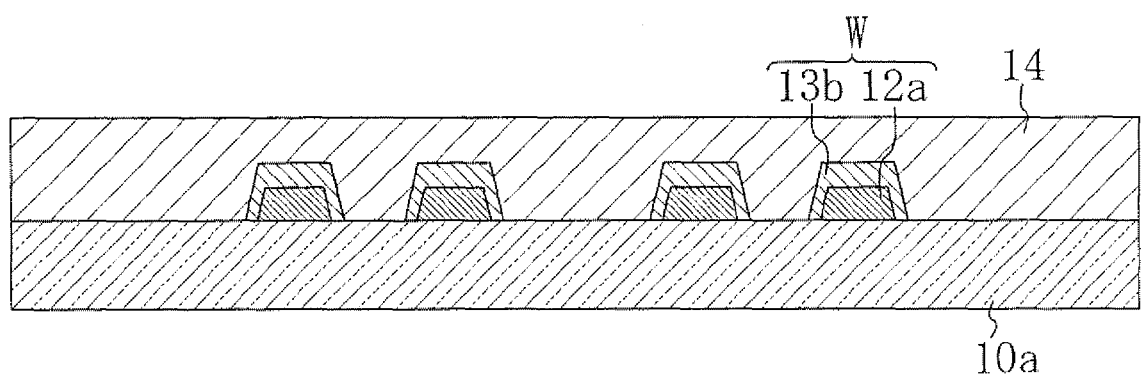
FIG. 19 is a cross-sectional view of a substrate corresponding to FIG. 4 after a silicon nitride film 14 is formed.

First, as PAS deposition in St10 of FIG. 7, a silicon nitride film 14 (thickness: about 1,500 Å) is deposited by, for example, a CVD (Chemical Vapor Deposition) method as a protective film (Passivation film) so as to cover the touch electrode 13*a* and the wiring portions W, as shown in FIGS. 14 and 19, As PAS photolithography in St11 of FIG. 7, a resist film is then formed by applying a resist made of a photosensitive resin onto the silicon nitride film 14, and a fourth resist pattern (not shown) is formed by exposing and developing the resist film.

As PAS etching in St12 of FIG. 7, by dry or wet etching the silicon nitride film 14 by using the fourth resist pattern as a mask, a protective film 14*a* is formed as shown in FIGS. 3 and 4.

Note that the aluminum layer 11*a*, titanium nitride layer 12*a*, and touch electrode 13*a* formed as described above have a surface resistance of 0.2Ω, 7Ω to 40Ω, and 1 kΩ, respectively. The surface resistance (Ω) is herein an electric resistance per unit area and is also called a sheet resistance, and is also indicated by $\Omega/\square$ or $\Omega/\text{sq.}$ (ohm per square).

The touch panel 20a can thus be manufactured.

Hereinafter, specific experiments performed will be described.

More specifically, as a practical example of the invention, a touch panel 20a having the same structure as that of the above embodiment was manufactured and the surface resistance of a touch electrode 13a was measured.

Figure 43:
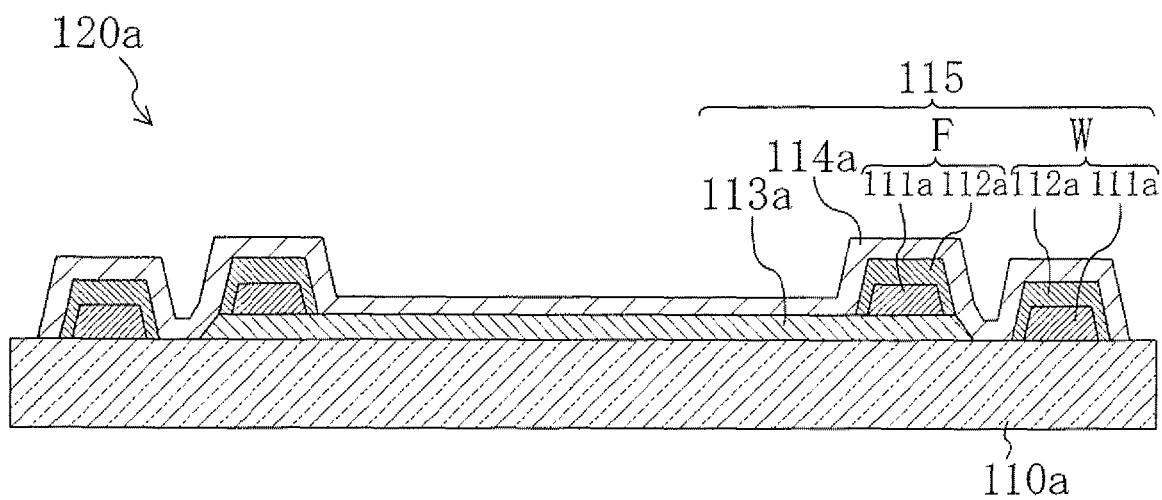
FIG. 43 is a cross-sectional view in the panel plane of a touch panel 120a of to a comparative example.
Figure 44:
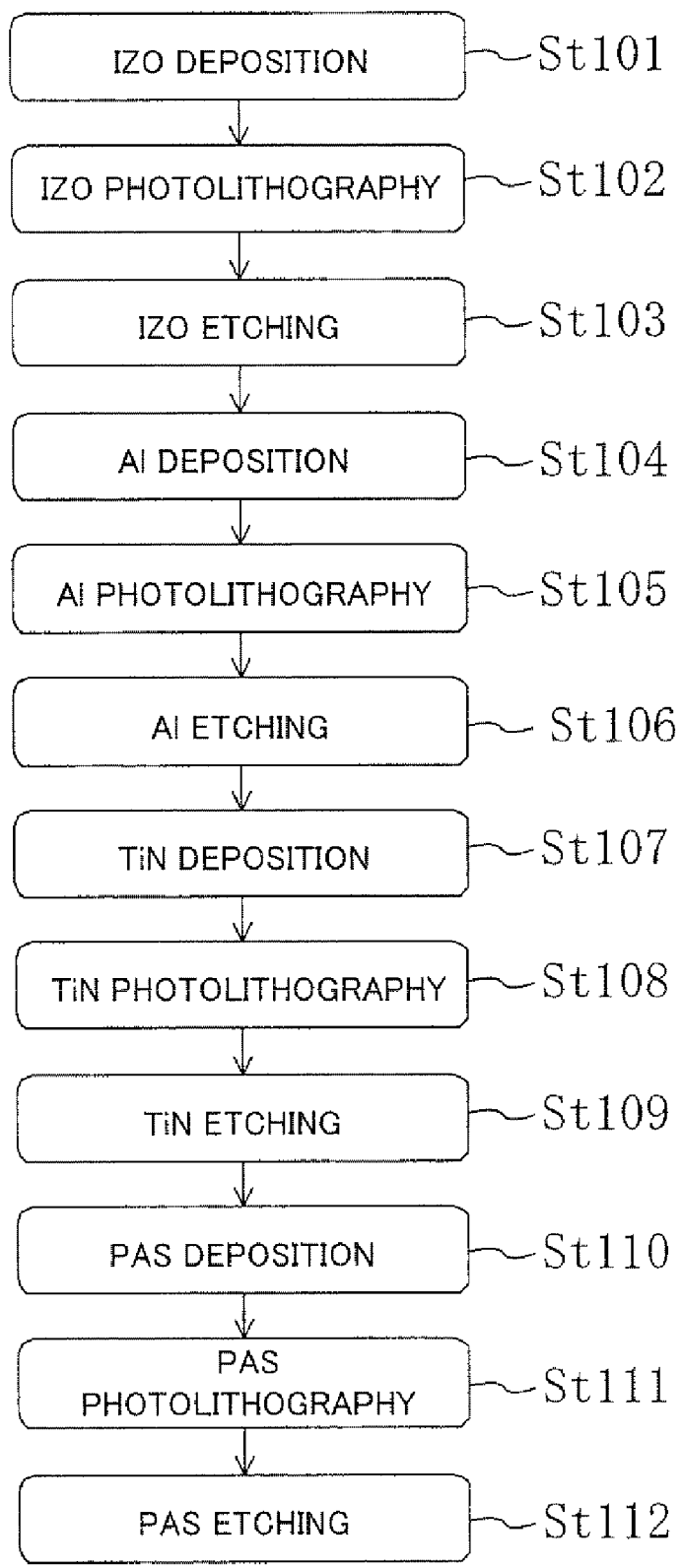

As a comparative example of the invention, a touch panel 120a as shown in FIG. 43 was manufactured by a method according to the flowchart of FIG. 4 and the surface resistance of a touch electrode 113a was measured. Steps St7 to St9, St1 to St3, St4 to St6, and St10 to St12 in the flowchart of FIG. 7 described in the above embodiment were respectively performed in steps St101 to St103, St104 to St106, St107 to St109, and St110 to St112 in the flowchart of FIG. 44. In the touch panel 120a of FIG. 43, each member (110a to 115) is indicated by a reference numeral having "1" added in front of the reference numeral of a corresponding member (10a to 15) in the touch panel 20a of the above embodiment. For example, a touch electrode 113a of the touch panel 120a in FIG. 43 corresponds to the touch electrode 13a of the touch panel 12a in FIG. 3. The touch electrode 113a is made of the same material as that of the touch electrode 13a and has the same function as that of the touch electrode 13a.

The measurement result in the practical example and comparative example will now be described.

FIG. 20 is a schematic plan view showing the surface resistance of an IZO layer (touch electrode 13a) in a substrate S1 of the practical example. FIG. 45 is a schematic plan view showing the surface resistance of an IZO layer (touch electrode 113a) in a substrate S2 of the comparative example. In FIGS. 20 and 45, C1 through C8 show a cell formation region, and the numerical values on the ordinate shown on the left side of the figure and the numerical values on the abscissa shown at the top of the figure indicate positions from one corner (the upper left corner in the figure) of the substrate. Each numerical value in C1 through C8 is a surface resistance value of the IZO layer at a respective measurement point in the substrate. For example, in the substrate S1 of the practical example, the surface resistance at the measurement point of 165 mm (ordinate)/45 mm (abscissa) (the upper left portion in C3) is $9.8\times10^2\Omega$. Note that, in FIGS. 20 and 45, eight cells (C1 through C8) are formed and eight display devices are manufactured simultaneously.

In the substrate S1 of the practical example, as shown in FIG. 20, the surface resistance of the IZO layer ranges from $8.3\times10^2\Omega$ to $1.1\times10^3\Omega$, and there is a small variation in surface resistance value in the substrate plane.

In the substrate S2 of the comparative example, on the other hand, as shown in FIG. 45, the surface resistance of the IZO layer is $2.8\times10^3\Omega$ or more, and there is a large variation in surface resistance value in the substrate plane. Note that the sign "–" in FIG. 45 indicates a measurement point that could not be measured by a measuring apparatus (HA6100/RG-1200E made by NAPSON CORPORATION) used in the experiments. It is estimated that the surface resistance was 1 G (giga) $\Omega$ or more at these measurement points. In the comparative example, the frame portion F and the wiring portions W were formed by dry etching after the touch electrode 113a was formed. It is considered that the surface of the touch electrode 113a was partially etched by the dry etching process and therefore the comparative example has a large variation in surface resistance value of the IZO layer as described above because.

Based on the above results, it was confirmed that the invention can suppress variation in resistance value of the IZO layer in the substrate plane.

As has been described above, in the touch panel 20a and the manufacturing method thereof according to the embodiment, the touch electrode 13a is formed in the touch electrode formation step after the frame portion F and the wiring portions W are formed on the insulating substrate 10a in the conductive potion formation step. Since the touch electrode 13a has not been formed yet in the conductive portion formation step, the touch electrode 13a is not etched in the conductive portion formation step. This reduces variation in film thickness of the touch electrode 13a in the substrate plane and thus reduces variation in resistance value of the touch electrode 13a in the substrate plane. Reduction in position recognition accuracy of the touch panel 20a can therefore be suppressed. A capacitive type touch panel having high position recognition accuracy can thus be provided.

In this embodiment, the frame portion F and the wiring portions W are simultaneously formed in the conductive portion formation step. The frame portion F and the wiring portions W can thus be formed without increasing the manufacturing process.

In this embodiment, the touch electrode 13a is formed by an IZO film. However, the touch electrode 13a may alternatively be formed by a high resistance ITO (Indium Tin Oxide) film, ATO (Antimony Tin Oxide) film, or the like by a sputtering method, or may be formed by ITO nano ink, a polymer conductive film, or the like by a printing method such as flexo printing and inkjet printing. Nano ink herein refers to ink having fine particles with a diameter of several nanometers dispersed in a solvent.

In this embodiment, the frame portion F and the wiring portions W are formed by an aluminum film or the like. However, the frame portion F and the wiring portions W may alternatively be formed by nano ink having Au or Ag dispersed therein, or the like by a printing method such as flexo printing and inkjet printing.

In this embodiment, the protective film 14a is formed by an inorganic insulating film such as a titanium nitride film. However, the protective film 14a may alternatively be formed by an organic SOG (Spin on Glass) film, a photosensitive organic resin film, or the like by a spin coat method, or may be formed by an organic insulating film by dry film lamination. Alternatively, the protective layer 14a may be directly formed by forming (patterning) the organic SOG (Spin on Glass) film or photosensitive organic resin film by flexo printing, inkjet printing, or the like.

(Second Embodiment)

Figure 21:
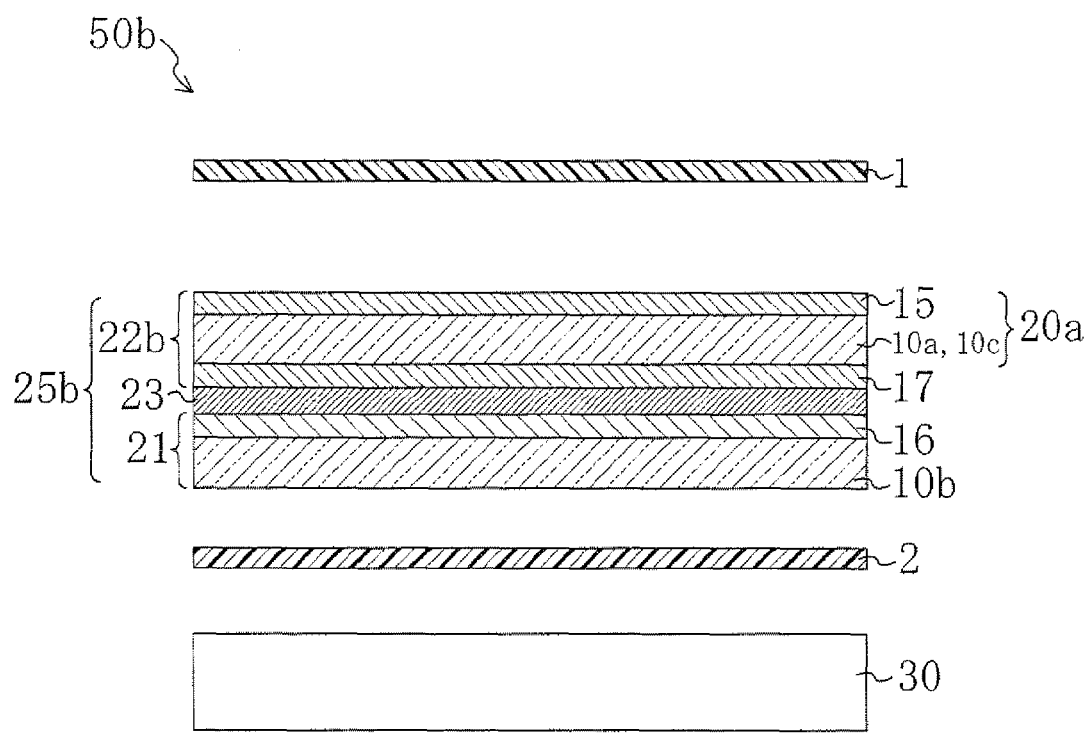
FIG. 21 is a structural diagram of a liquid crystal display device 50b according to a second embodiment.

FIG. 21 is a structural diagram of a liquid crystal display device 50b according to a second embodiment. Note that, in each of the embodiments shown below, the same elements as those of FIGS. 1 through 20 are denoted with the same reference numerals and characters and detailed description thereof is omitted.

In the liquid crystal display device 50b, as shown in FIG. 21, a touch panel 20a is incorporated into a liquid crystal display panel 25b. More specifically, in a color filter substrate 22b of the liquid crystal display device 50b, a touch panel layer 15 is formed on a substrate surface opposite to a color filter layer 17. An insulating substrate 10a of the touch panel 20a serves also as an insulating substrate 10c of the color filter substrate 22b. The number of insulating substrates is thus reduced by one as compared to the liquid crystal display device 50a of the first embodiment. Since a required number of insulating substrates such as a glass substrate is reduced, reduction in weight of the liquid crystal display device, and the like can be achieved. Moreover, a polarizing plate 1 is an outermost surface of the liquid crystal display device 50b and structurally protects the touch panel 20a. Reduction in position recognition accuracy of the touch panel 20a due to damages can therefore be suppressed.

(Third Embodiment)

Figure 22:
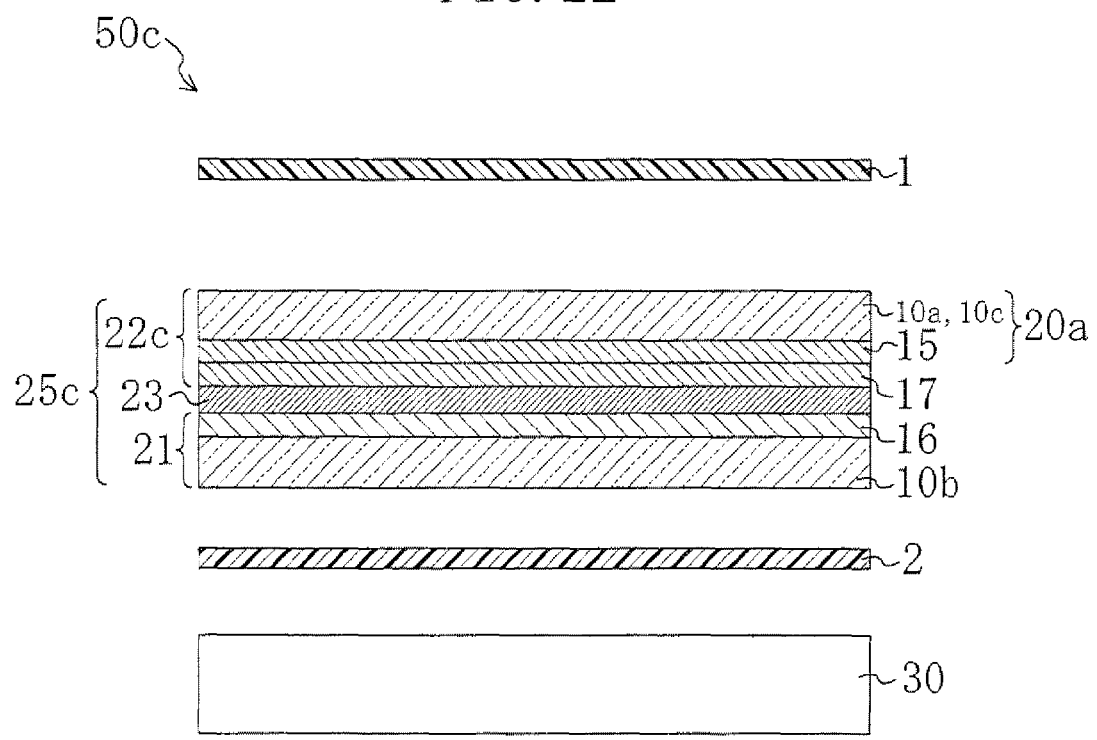
FIG. 22 is a structural diagram of a liquid crystal display device 50c according to a third embodiment.

FIG. 22 is a structural diagram of a liquid crystal display device 50c according to a third embodiment.

In the liquid crystal display device 50c, as shown in FIG. 22, a touch panel 20a is incorporated into a liquid crystal panel 25c. More specifically, in a color filter substrate 22c of the liquid crystal display device 50c, a touch panel layer 15 is formed between an insulating substrate 10a (10c) and a color filter layer 17. In this structure, a required number of insulating substrates such as a glass substrate is reduced, and therefore reduction in weight of the liquid crystal display device, and the like can be achieved. Moreover, a polarizing plate 1 is an outermost surface of the liquid crystal display device 50c and structurally protects the touch panel 20a. Reduction in position recognition accuracy of the touch panel 20a due to damages can therefore be suppressed.

(Fourth Embodiment)

The capacitive type touch panel 20a is described in the above embodiments. However, the invention is also applicable to a resistive type touch panel, as described below.

Figure 23:
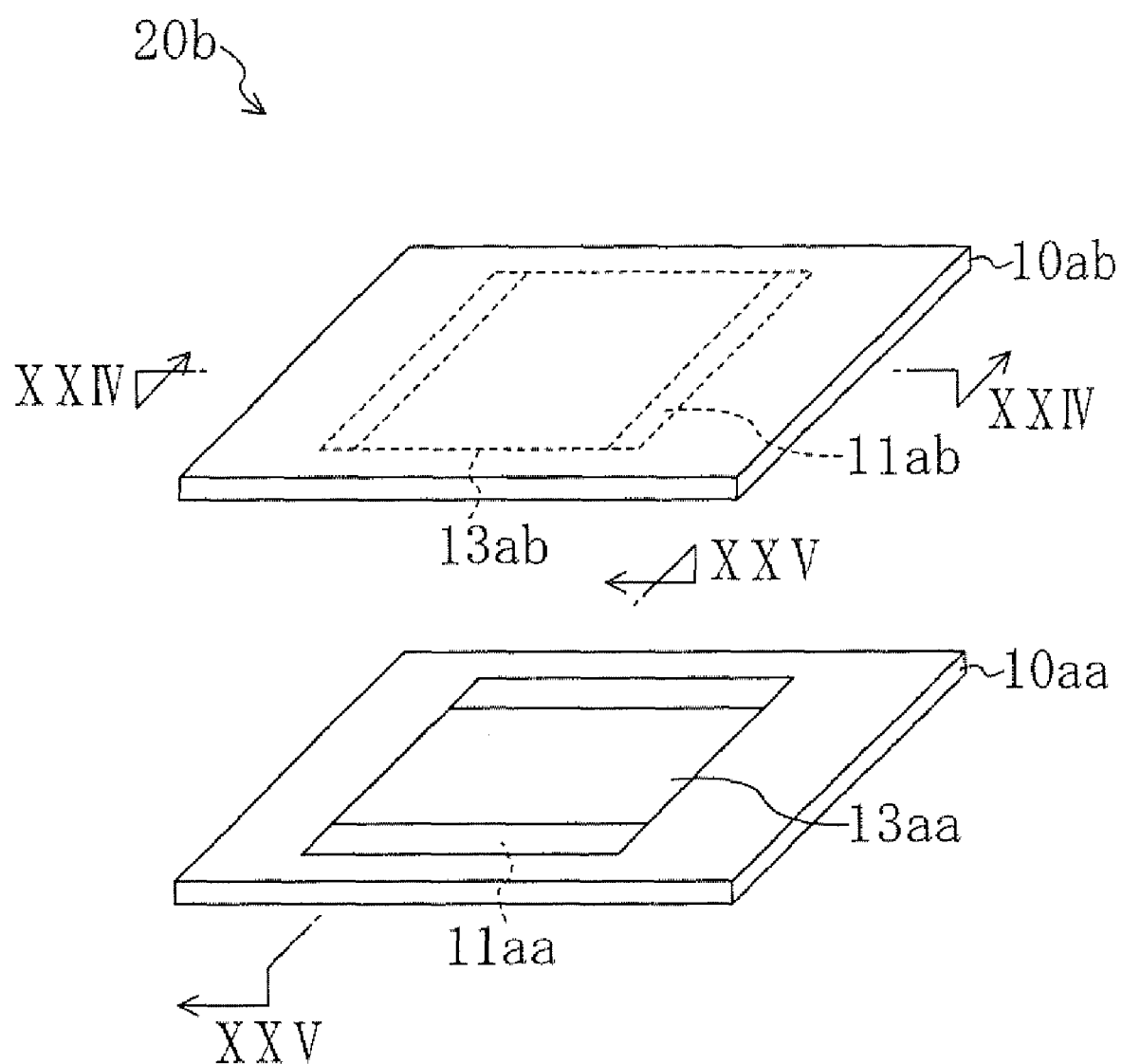
FIG. 23 is a perspective view of a touch panel 20b according to a fourth embodiment.

FIG. 23 is a perspective view of a touch panel 20b according to a fourth embodiment.

As shown in FIG. 23, the touch panel 20b includes a first substrate 10aa and a second substrate 10ab which are insulating substrates and provided so as to face each other, and an insulating dot spacer (not shown) provided between the substrates.

Figure 25:
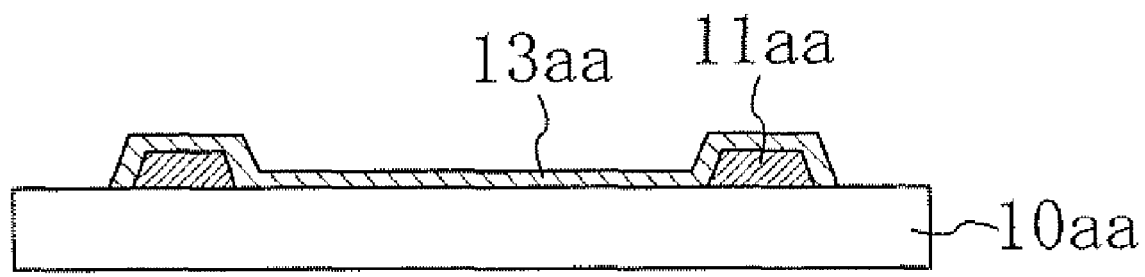
FIG. 25 is a cross-sectional view of a first substrate 10aa of the touch panel 20b taken along line XXV-XXV in FIG. 23.

As shown in FIGS. 23 and 25, the first substrate 10aa includes, on its top surface (on the second substrate 10ab side), a rectangular touch electrode 13aa and a pair of conductive portions 11aa respectively provided on opposing sides of the touch electrode 13aa.

Figure 24:
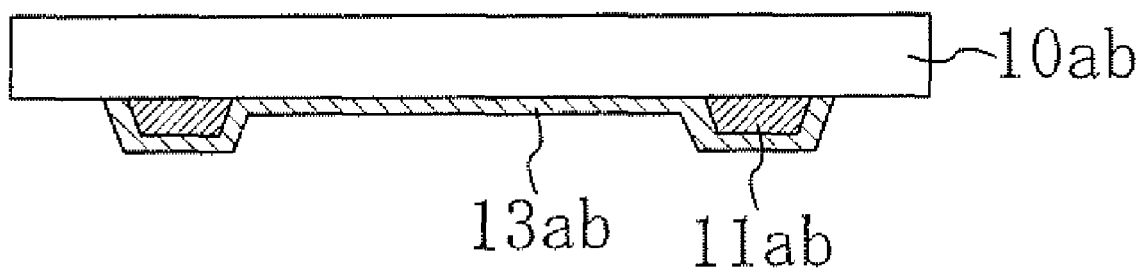
FIG. 24 is a cross-sectional view of a second substrate 10ab of the touch panel 20b taken along line XXIV-XXIV in FIG. 23.

As shown in FIGS. 23 and 24, the second substrate 10ab includes, on its bottom surface (on the first substrate 10aa side), a rectangular touch electrode 13ab and a pair of conductive portions 11ab respectively provided on opposing sides of the touch electrode 13ab.

In the touch panel 20b, as shown in FIG. 23, the pair of conductive portions 11aa that form an X coordinate circuit and the pair of conductive portions 11ab that form a Y coordinate circuit are provided so as to extend perpendicularly to each other. The conductive portions 11aa and 11ab are provided on the substrate side of the touch electrodes 13aa and 13ab, respectively.

A position detection circuit (not shown) for receiving and outputting a position detection signal from and to the touch electrodes 13aa and 13ab is connected to the conductive portions 11aa and 11ab through a wiring portion (not shown). When the top surface of the second substrate 10ab of the touch panel 20b is touched, the touch electrode 13aa on the first substrate 10aa and the touch electrode 13ab on the second substrate 10ab are brought into contact with each other, which causes a change in resistance value between each conductive portion 11aa, 11ab and the touched point. The position detection circuit detects the touched position based on the change in resistance value.

According to the touch panel 20b of this embodiment, the conductive portions 11aa and 11ab are respectively provided between the first substrate 10aa and the touch electrode 13aa and between the second substrate 10ab and the touch electrode 13ab. The touch electrode 13aa is therefore formed after the conductive portions 11aa are formed on the first substrate 10aa. Moreover, the touch electrode 13ab is formed after the conductive portions 11ab are formed on the second substrate 10ab. Since the touch electrode 13aa has not been formed yet when the conductive portions 11aa are formed, the touch electrode 13aa is not etched during formation of the conductive portions 11aa. Moreover, since the touch electrode 13ab has not been formed yet when the conductive portions 11ab are formed, the touch electrode 13ab is not etched during formation of the conductive portions 11aa. This reduces variation in film thickness of the touch electrodes 13aa and 13ab in the substrate plane and thus reduces variation in resistance value of the touch electrodes 13aa and 13ab in the substrate plane. Reduction in position recognition accuracy of the touch panel can therefore be suppressed. A resistive type touch panel having high position recognition accuracy can thus be provided.

(Fifth Embodiment)

Figure 26:
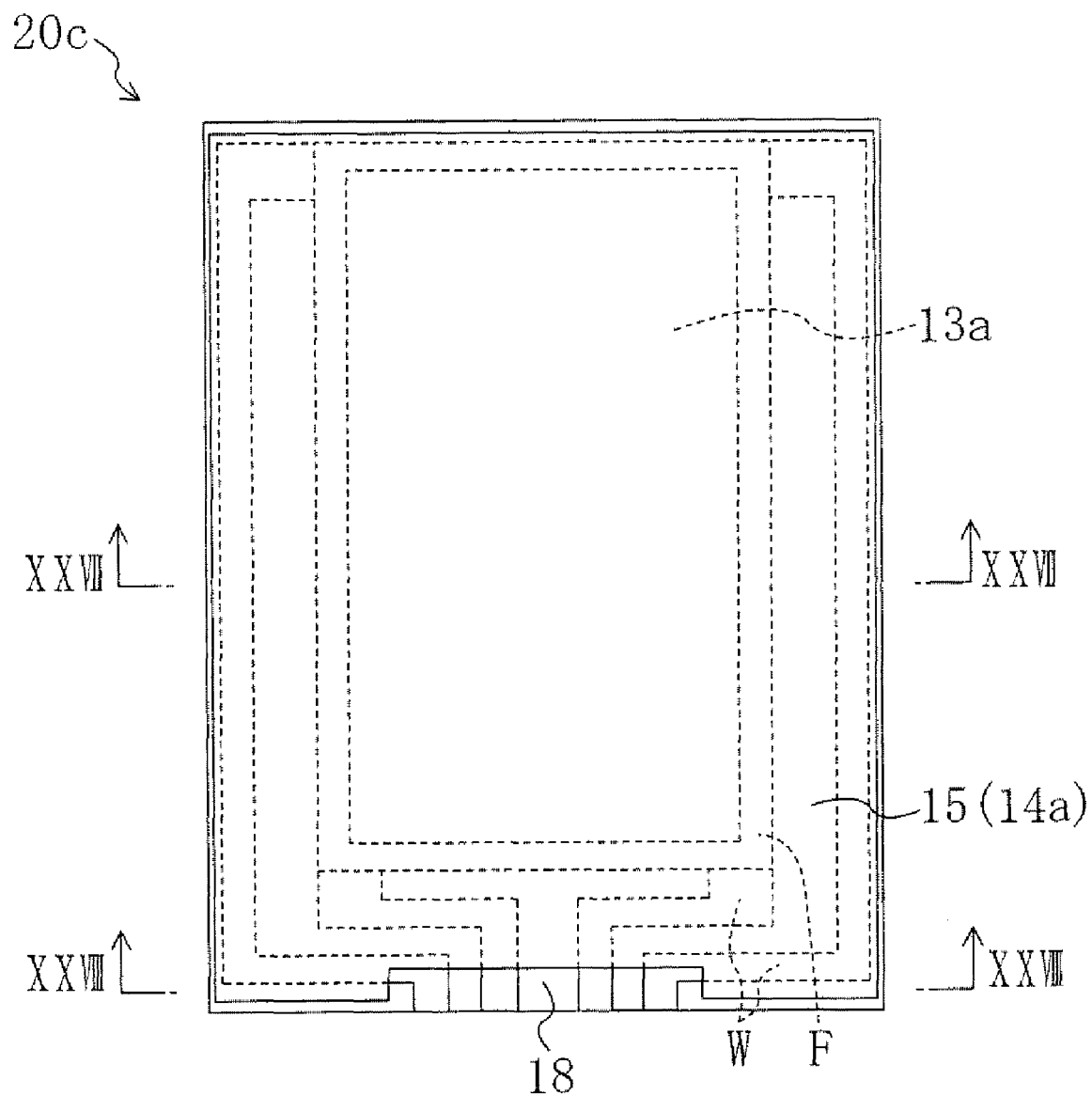
FIG. 26 is a plan view of a touch panel 20c according to a fifth embodiment.
Figure 27:
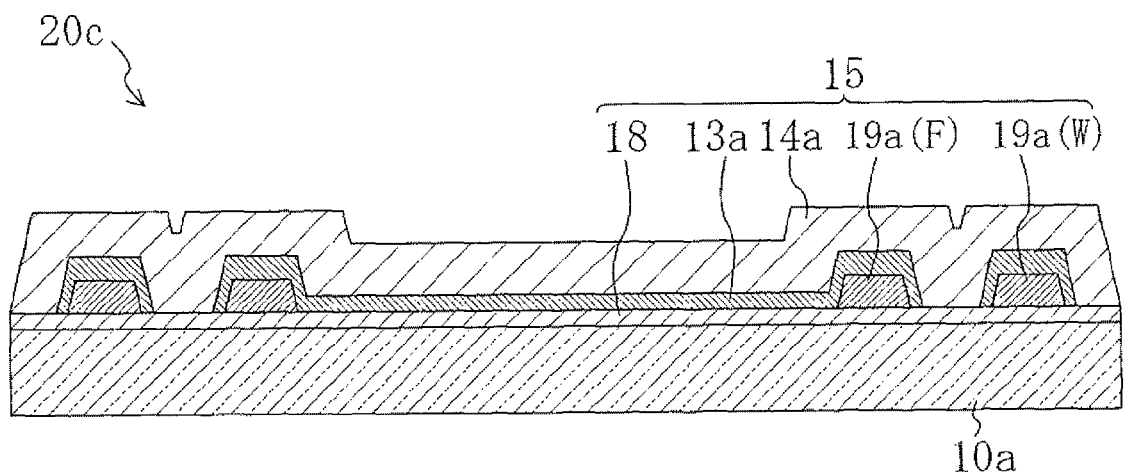
FIG. 27 is a cross-sectional view in the panel plane of the touch panel 20c taken along line XXVII-XXVII in FIG. 26.
Figure 28:
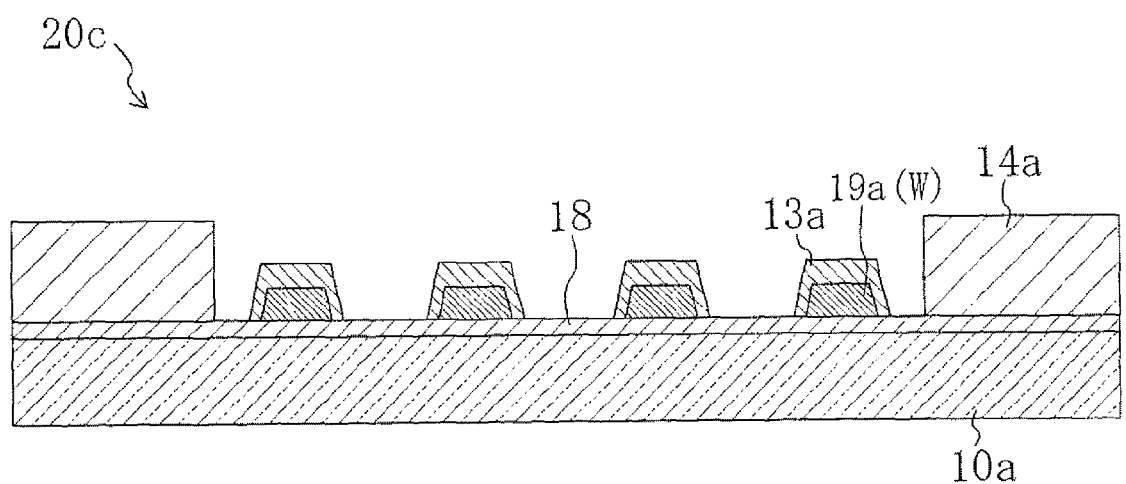
FIG. 28 is a cross-sectional view of a terminal portion of the touch panel 20c taken along line XXVIII-XXVIII in FIG. 26.

FIG. 26 is a plan view of a touch panel 20c according to a fifth embodiment. FIG. 27 is a cross-sectional view in the panel plane of the touch panel 20c taken along line XXVII-XXVII in FIG. 26. FIG. 28 is a cross-sectional view of a terminal portion of the touch panel 20c taken along line XXVIII-XXVIII in FIG. 26.

As shown in FIGS. 26 through 28, the touch panel 20c includes an insulating substrate 10a and a touch panel layer 15 provided on the insulating substrate 10a.

As shown in FIGS. 26 and 27, the touch panel layer 15 includes: a titanium oxide film 18 provided on the insulating substrate 10a as an interlayer film for improving an adhesion property between the insulating substrate 10a and a frame portion F (19a) and wiring portions W (19a) described below; a rectangular touch electrode 13a provided on the titanium oxide film 18; a frame portion F (19a) provided between the titanium oxide film 18 and the touch electrode 13a as a rectangular frame-shaped conductive portion along the periphery of the touch electrode 13a; four wiring portions W (19a) provided between the titanium oxide film 18 and the touch electrode 13a and respectively connected to the four corners of the frame portion F; and a protective film 14a provided so as to cover the touch electrode 13a, the frame portion F (19a), and each wiring portion W (19a).

In the touch panel 20c, as shown in FIGS. 26 and 28, each wiring portion W (19a) is exposed from the protective layer 14a in the terminal portion. Each wiring portion W (19a) is covered by an extended portion of the touch electrode 13a.

Hereinafter, a manufacturing method of the touch panel 20c of the above structure will be described with reference to the cross-sectional views of FIGS. 29 through 40. FIGS. 29 through 34 are cross-sectional views of a substrate corresponding to FIG. 27 during the manufacturing process, and FIGS. 35 through 40 are cross-sectional views of the substrate corresponding to FIG. 28 during the manufacturing process. The manufacturing method of this embodiment includes an interlayer film formation step, a conductive portion formation step, a touch electrode formation step, and a protective layer formation step.

(Interlayer Film Formation Step)

Figure 29:
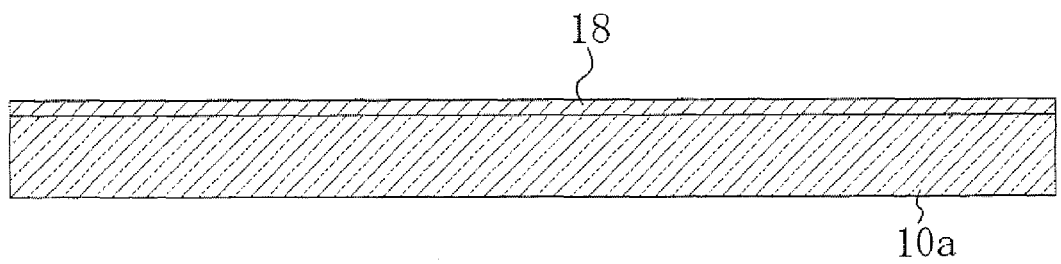
FIG. 29 is a cross-sectional view of a substrate corresponding to FIG. 27 after a titanium oxide film 18 is formed.
Figure 35:
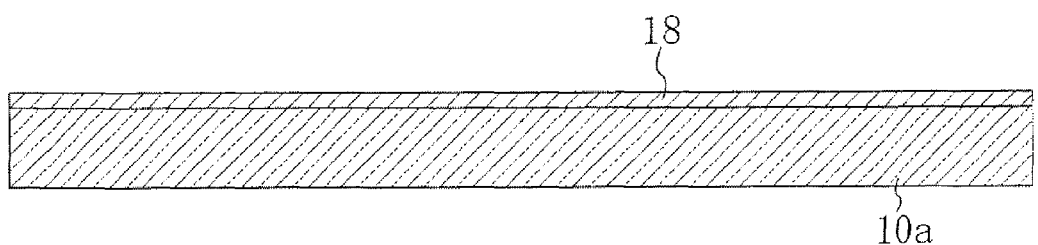
FIG. 35 is a cross-sectional view of a substrate corresponding to FIG. 28 after a titanium oxide film 18 is formed.

As shown in FIGS. 29 and 35, a titanium oxide film 18 (thickness: about 100 Å), for example, is formed by a sputtering method as an interlayer film on an insulating substrate 10a such as a glass substrate.

(Conductive Portion Formation Step)

Figure 30:
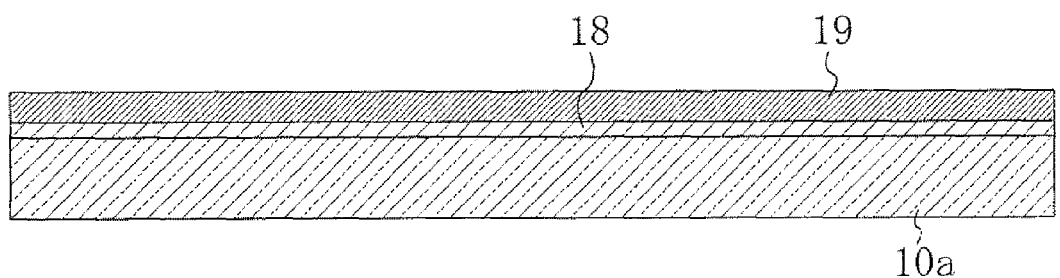
FIG. 30 is a cross-sectional view of a substrate corresponding to FIG. 27 after an AP film 19 is formed.
Figure 36:
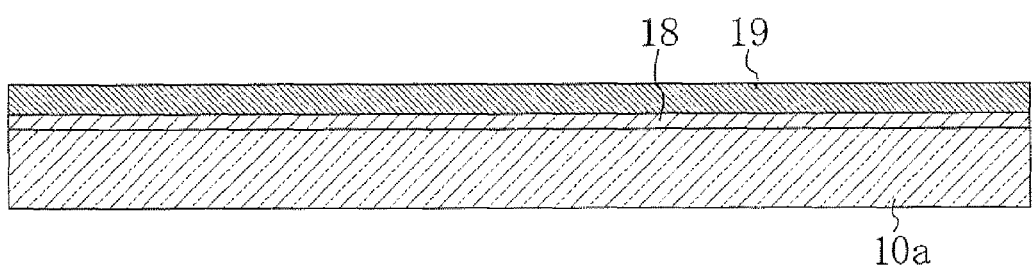
FIG. 36 is a cross-sectional view of a substrate corresponding to FIG. 28 after an AP film 19 is formed.

First, as shown in FIGS. 30 and 36, an AP film 19 (thickness: about 1,250 Å to about 2,000 Å), a silver-palladium alloy film, for example, is formed by a sputtering method as a metal conductive film on the titanium oxide film 18. Note that, instead of a silver-palladium alloy film described above, the AP film 19 may be an alloy film containing silver, palladium, and copper.

A resist film is then formed by applying a resist made of a photosensitive resin onto the AP film 19, and a first resist pattern (not shown) is formed by exposing and developing the resist film.

Figure 31:
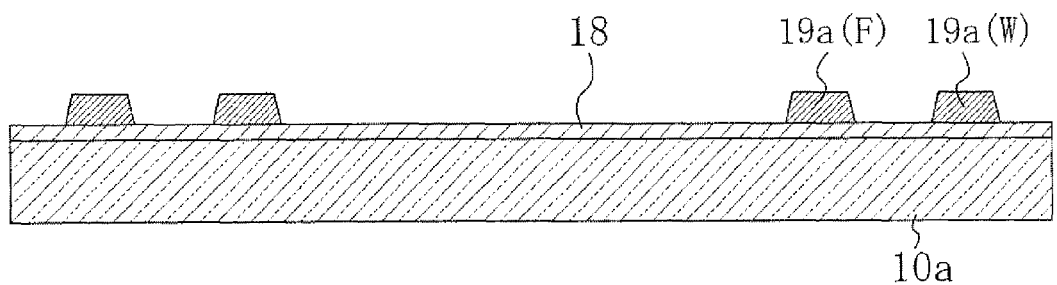
FIG. 31 is a cross-sectional view of a substrate corresponding to FIG. 27 after the AP film 19 is patterned.
Figure 37:
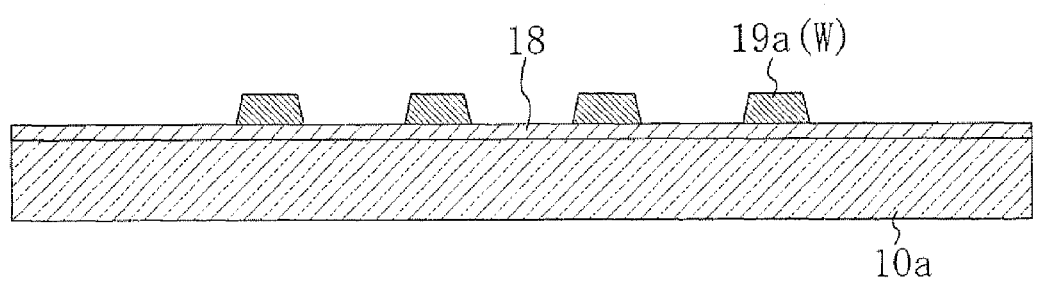
FIG. 37 is a cross-sectional view of a substrate corresponding to FIG. 28 after the AP film 19 is patterned.

By using the first resist pattern as a mask, the AP film 19 is wet etched with, for example, a weakly acidic etchant containing nitric acid, acetic acid, and phosphoric acid. A frame portion F (19a) and wiring portions W (19a) are thus formed as shown in FIGS. 31 and 37.

(Touch Electrode Formation Step)

Figure 32:
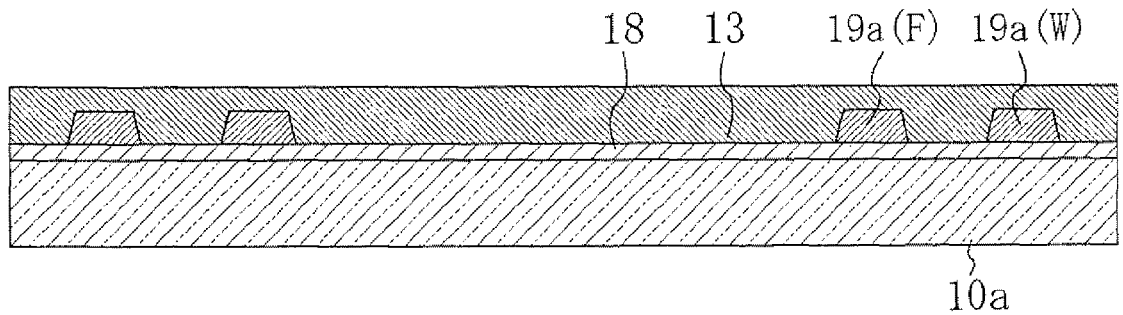
FIG. 32 is a cross-sectional view of a substrate corresponding to FIG. 27 after an ITO film 13 is formed.
Figure 38:
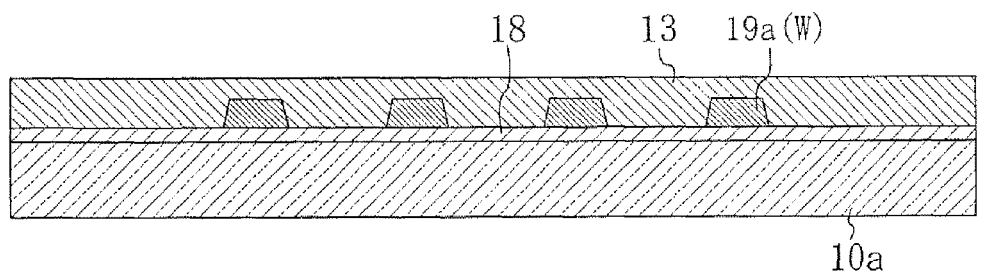
FIG. 38 is a cross-sectional view of a substrate corresponding to FIG. 28 after an ITO film 13 is formed.

First, as shown in FIGS. 32 and 38, an ITO (Indium Tin Oxide) film 13 (thickness: about 100 Å to about 150 Å), for example, is formed by a sputtering method as a transparent conductive film so as to cover the frame portion F (19a) and the wiring portions W (19a). The transparent conductive film may be an IZO film or the like as in the above embodiments.

A resist film is then formed by applying a resist made of a photosensitive resin onto the ITO film 13, and a second resist pattern (not shown) is formed by exposing and developing the resist film.

Figure 33:
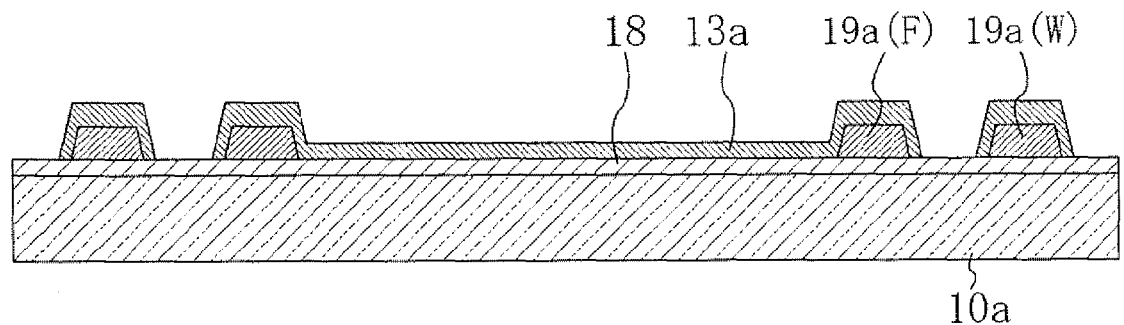
FIG. 33 is a cross-sectional view of a substrate corresponding to FIG. 27 after the ITO film 13 is patterned.
Figure 39:
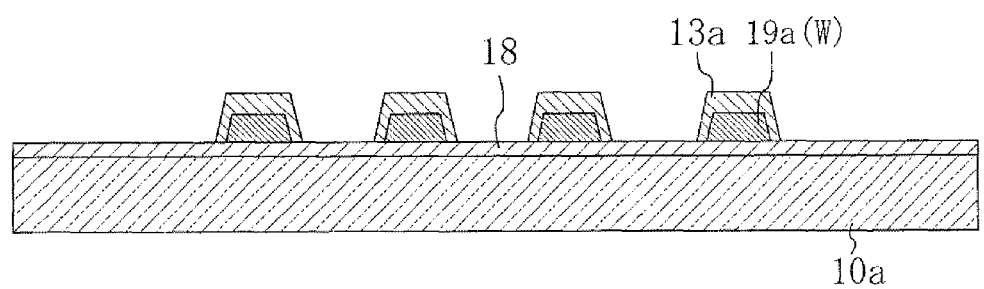
FIG. 39 is a cross-sectional view of a substrate corresponding to FIG. 28 after the ITO film 13 is patterned.

By using the second resist pattern as a mask, the ITO film 13 is wet etched with, for example, a weakly acidic etchant containing hydrochloric acid. A touch electrode 13a and an extended portion thereof are thus formed as shown in FIGS. 33 and 39.

(Protective Film Formation Step)

Figure 34:
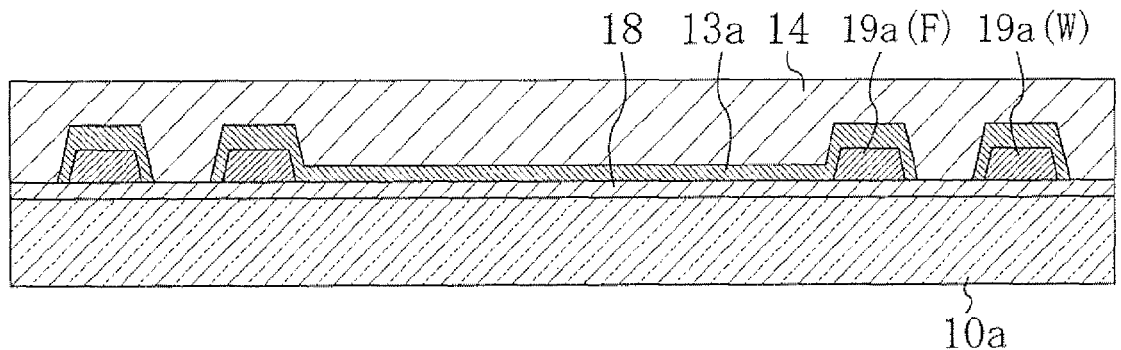
FIG. 34 is a cross-sectional view of a substrate corresponding to FIG. 27 after a silicon nitride film 14 is formed.
Figure 40:
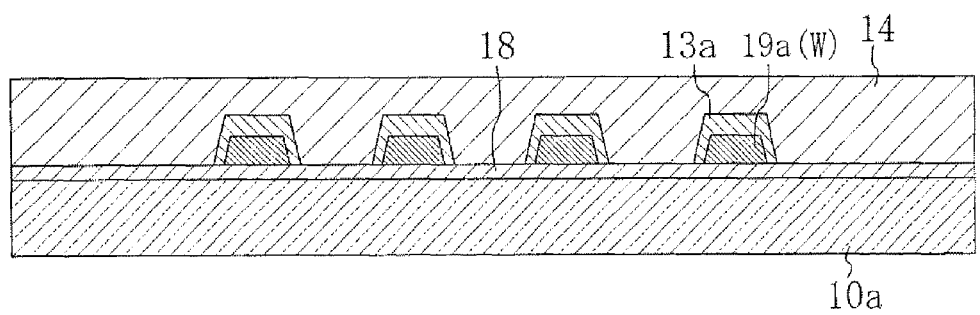
FIG. 40 is a cross-sectional view of a substrate corresponding to FIG. 28 after a silicon nitride film 14 is formed.

First, as shown in FIGS. 34 and 40, a photosensitive resin film 14 (thickness: about 20,000 Å), for example, is attached as a protective film so as to cover the touch electrode 13a.

A protective layer 14a is formed by exposing and developing the resin film 14.

Note that the AP film 19 and the ITO film 13 formed as described above have a surface resistance of, for example, 0.25Ω and 150Ω to 1,000Ω, respectively.

The touch panel 20c can thus be manufactured.

In the touch panel 20c of this embodiment, the frame portion F (19a) and the wiring portions W (19a) are formed by a highly conductive alloy film containing silver and palladium. The frame portion F (19a) and the wiring portions W (19a) can thus be formed with a small thickness and the touch electrode 13a can easily cover the frame portion F (19a) and the wiring portions W (19a). In the case where the frame portion F (19a) and the wiring portions F (19a) are formed by an alloy film containing silver, palladium, and copper, reliability of migration resistance, corrosion resistance, and the like can be improved by this alloy film.

In the touch panel 20c, the touch electrode 13a is extended so as to cover the frame portion F (19a) and the wiring portions W (19a) which are formed by an alloy film containing silver and palladium whose electric resistance is likely to change with time. Change in electric resistance with time can therefore be suppressed in the frame portion F (19a) and the wiring portions W (19a). Moreover, since the touch electrode 13a is formed so as to cover the frame portion F (19a) and the wiring portions W (19a) in the touch electrode formation step, the frame portion F (19a) and the wiring portions W (19a) can be protected from hydrochloric acid contained in the etchant for patterning the ITO film 13.

In the touch panel 20c, the frame portion F (19a) and the wiring portions W (19a) are formed by an alloy film containing silver and palladium. This suppresses a galvanic corrosion reaction between a compound of indium oxide and tin oxide, that is, an ITO film, and an aluminum film, which occurs when the frame portion F and the wiring portions W are formed by an aluminum film.

(Sixth Embodiment)

Figure 41:
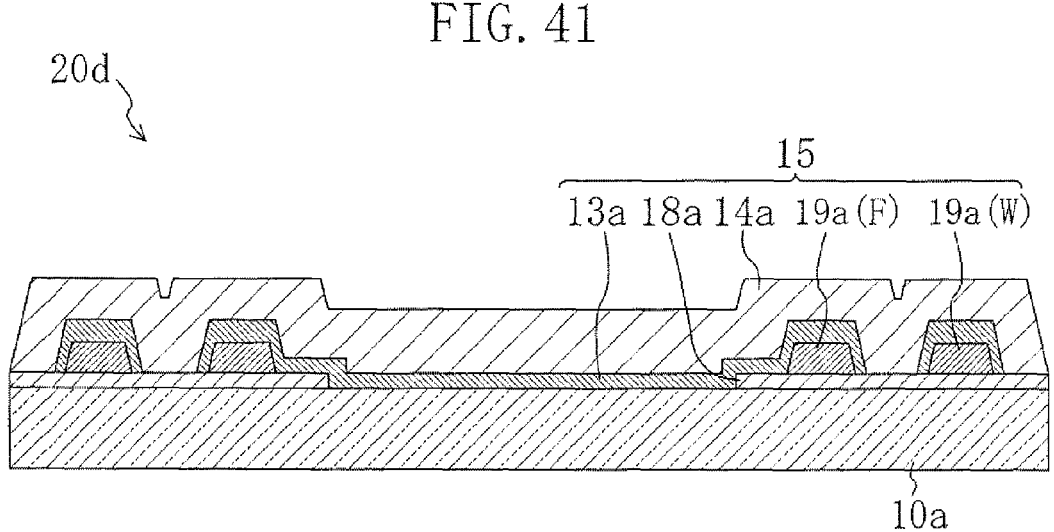
FIG. 41 is a cross-sectional view in the panel plane of a touch panel 20d according to a sixth embodiment.

FIG. 41 is a cross-sectional view in the panel plane of a touch panel 20d according to a sixth embodiment.

In the touch panel 20d, as shown in FIG. 41, a titanium oxide film 18a is provided only in a region overlapping a frame portion F (19a) and wiring portions W (19a). The titanium oxide film 18a is not provided in a region other than the region overlapping the frame portion F (19a) and the wiring portions W (19a). In other words, the titanium oxide film 18a is not provided in the panel plane (a display region in a liquid crystal display device). The transmittance of the touch panel 20d and liquid crystal display device including the touch panel 20d can therefore be improved. Note that the titanium oxide film 18a can be formed by using a metal mask or the like in a sputtering method.

(Seventh Embodiment)

Figure 42:
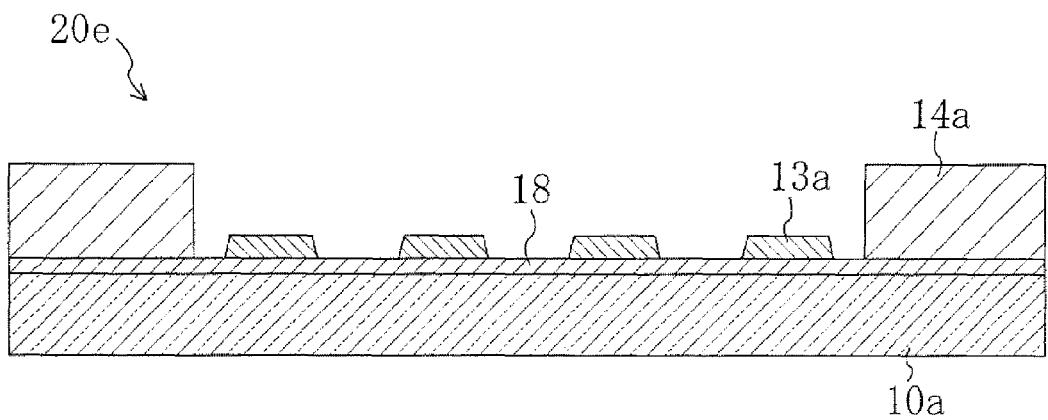
FIG. 42 is a cross-sectional view of a terminal portion of a touch panel 20e according to a seventh embodiment.

FIG. 42 is a cross-sectional view of a terminal portion of a touch panel 20e according to a seventh embodiment.

The touch panel 20e is substantially the same as the touch panel 20c of the fifth embodiment in the structure in the panel plane. As shown in FIG. 42, however, the wiring portion W (19a) that is present in the terminal portion in the fifth embodiment (see FIG. 28) is omitted, and only the extended portion of the touch electrode 13a formed on the wiring portions W (19a) in the panel plane is left in the terminal portion. In this structure, an alloy film containing silver and palladium which forms the wiring portions W will not be exposed in the terminal portion, whereby change of electric resistance with time can be suppressed in the wiring portions W (19a).

INDUSTRIAL APPLICABILITY

As has been described above, the invention can provide a touch panel having high position recognition accuracy. The invention is therefore useful for a display device such as a liquid crystal display device having a touch panel.

The invention claimed is:

1. A touch panel, comprising: an insulating substrate; a transparent touch electrode provided on the insulating substrate; and a conductive portion connected to a periphery of the touch electrode, for detecting a touched position on the touch electrode based on an electric signal through the conductive portion, wherein the conductive portion is provided between the insulating substrate and the touch electrode.

2. The touch panel according to claim 1, wherein the conductive portion is a frame portion provided along the periphery of the touch electrode, and a wiring portion connected to the touch electrode through the frame portion is connected to the frame portion.

3. The touch panel according to claim 2, wherein the frame portion and the wiring portion are formed by a same material.

4. The touch panel according to claim 2, wherein the frame portion has a rectangular frame shape, and four wiring portions are provided so as to be respectively connected to four corners of the frame portion.

5. The touch panel according to claim 2, wherein the frame portion and the wiring portion are formed by an alloy film containing silver and palladium or an alloy film containing silver, palladium, and copper.

6. The touch panel according to claim 5, wherein the insulating substrate is a glass substrate, and an interlayer film for improving an adhesion property between the insulating substrate and the frame portion and wiring portion is provided between the insulating substrate and the frame portion and wiring portion.

7. The touch panel according to claim 5, wherein the interlayer film is provided only in a region overlapping the frame portion and the wiring portion.

8. The touch panel according to claim 5, wherein the touch electrode is extended so as to cover the frame portion and the wiring portion.

9. The touch panel according to claim 8, wherein the touch electrode is extended at an end of the wiring portion, and a terminal portion of the wiring portion is formed by the extended portion of the touch electrode at the end of the wiring portion.

10. The touch panel according to claim 5, wherein the touch electrode is formed by a compound of indium oxide and tin oxide.

11. A display device, comprising: the touch panel according to claim 1; and a display panel provided so as to face the touch panel.

* * * * *